(12) United States Patent
Rodgers et al.

(10) Patent No.: US 8,955,146 B1
(45) Date of Patent: Feb. 10, 2015

(54) SYSTEM AND METHOD FOR REGULATED COLLABORATION MARKETPLACE

(75) Inventors: William B. Rodgers, Austin, TX (US); Jason Myers Dupuy, Austin, TX (US); Donald Gerald Karp, Austin, TX (US)

(73) Assignee: CBANC Network, Inc., Austin, TX (US)

( * ) Notice: Subject to any disclaimer, the term of this patent is extended or adjusted under 35 U.S.C. 154(b) by 220 days.

(21) Appl. No.: 13/484,055

(22) Filed: May 30, 2012

(51) Int. Cl.
H04L 29/06 (2006.01)

(52) U.S. Cl.
USPC .......... 726/27; 726/1; 705/51; 705/300; 705/301; 709/201; 709/217; 709/218; 709/227

(58) Field of Classification Search
None
See application file for complete search history.

(56) References Cited

U.S. PATENT DOCUMENTS

| | | | |
|---|---|---|---|
| 6,959,288 B1 * | 10/2005 | Medina et al. .................. 705/51 |
| 6,990,513 B2 * | 1/2006 | Belfiore et al. ............... 709/203 |
| 7,269,853 B1 * | 9/2007 | Dunn .............................. 726/27 |
| 7,334,013 B1 * | 2/2008 | Calinov et al. ................ 709/201 |
| 7,467,399 B2 * | 12/2008 | Nadalin et al. .................... 726/2 |
| 7,624,277 B1 * | 11/2009 | Simard et al. ................. 713/182 |
| 7,920,851 B2 * | 4/2011 | Moshir et al. ............. 455/414.2 |
| 8,769,127 B2 * | 7/2014 | Selimis et al. ................. 709/229 |
| 2002/0123957 A1 * | 9/2002 | Notarius et al. .................. 705/37 |
| 2003/0009385 A1 * | 1/2003 | Tucciarone et al. ............. 705/26 |
| 2010/0192072 A1 * | 7/2010 | Spataro et al. ................. 715/753 |
| 2011/0295988 A1 * | 12/2011 | Le Jouan ...................... 709/223 |
| 2012/0101881 A1 * | 4/2012 | Taylor et al. ............... 705/14.13 |
| 2013/0219456 A1 * | 8/2013 | Sharma et al. .................... 726/1 |
| 2013/0312117 A1 * | 11/2013 | Sapp et al. ....................... 726/30 |
| 2013/0318589 A1 * | 11/2013 | Ford et al. ......................... 726/7 |

OTHER PUBLICATIONS

Altunay, Mine; Byrd, Gregory T.; Brown, Doug E.; Dean, Ralph A. An Interaction-based Access Control Model (IBAC) for Collaborative Services. CTS 2008. Pub. Date: 2008. Relevant pp. 547-554. http://ieeexplore.ieee.org/stamp/stamp.jsp?tp=&arnumber=4543977.*

Shan, Zhe; Chiu, Dickson K.W.; Li, Qing. Systematic Interaction Management in a Workflow View Based Business-to-business Process Engine. HICSS '05. Pub. Date: 2005. http://ieeexplore.ieee.org/stamp/stamp.jsp?tp=&arnumber=1385563.*

* cited by examiner

Primary Examiner — Dede Zecher
Assistant Examiner — Jeremiah Avery
(74) Attorney, Agent, or Firm — Sprinkle IP Law Group

(57) ABSTRACT

A collaboration system includes a banker collaboration platform offering a first degree of access, and a vendor collaboration platform that offers a second degree of access to the banker collaboration platform. Vendors are not allowed to directly contact bankers and bankers' identities are maintained secret from the vendors. The two platforms can be part of a network site hosted on one or more server machines in a network environment.

20 Claims, 36 Drawing Sheets

You must be a representative of a US/Domestic financial institution to receive a login to cbanc. Please provide accurate information as we will confirm it before granting access.

| David |
| --- |

FIRST NAME*

| Sanders |
| --- |

LAST NAME* — 410, 412

| XX Employees Credit Union |
| --- |

FINANCIAL INSTITUTION NAME*

| 012345678 |
| --- |

ROUTING NUMBER* — 414

Why are we asking for your phone and valid bank or credit union email address?

A large part of why people are willing to share in cbanc is because they know and trust that everyone is a banking professional peer. We use the info below to verify that you are a current employee of a bank or credit union.

| dsanders@xxsecu.com |
| --- |

EMAIL ADDRESS* — 416

( [512] ) — [555] — [1234]

PHONE NUMBER* — 418

If you have a cbanc gift card enter the code number found on the back of the card below.

| |
| --- |

CODE NUMBER — 420

How did you hear about cbanc? — 422

Please list the name and/or organization who referred you so they can receive referral bonus points.

| |
| --- |

*FIG. 4B* cbanc
NETWORK
*where intelligence pays*

| *the* TOOLS | *the* INTELLIGENCE | *the* NETWORK |
|---|---|---|
| Our revolutionary collaboration platform. | Get content sorted by job function. | Learn the rules of the game in cbanc. |

MEMBER LOGIN

JOIN CBANC

Harnessing the brainpower of [3,978] financial institutions and [8,708] cbanc users.

420

THE TOOLS
Overview
The Exchange
Recent Activity
Most Popular
Latest
Exam Watch
Vendor Reviews
Answers
Topics
Classifieds

Thank you for joining the cbanc Network!

A email will be sent to you shortly with your login credentials, at which point you will be able to collaborate in a safe, secure environment with your peers from across the country.

THE DEFINITIVE SEARCH ENGINE FOR TACKLING TODAY'S TOP BANKING ISSUES.

SEARCH >

MEMBER SPOTLIGHT

"Tackling new projects takes a lot of time and effort. But with cbanc, this is a solution that gives me real work savings. Using the cbanc Network doesn't take up my time, it gives me my time back."
Rich Smith
*Flag Bank Minnesota*

JOIN CBANC TODAY!
Stop reinventing the wheel. Start letting your work pay you back!

ABOUT CBANC
Our Story
Our Mission
Our Team
News

GET INVOLVED
Associations
Service Partners
User Groups
Thought Leaders

Contact Us
Privacy Policy

| cbanc Network Login Credentials |
|---|
| support@cbancnetwork.com<br>Sent: Mon 3/5/2012 8:35 AM<br>To:   dsanders@xxsecu.com |

Dear David,

Welcome to cbanc Network, an online network of community financial institutions nationwide. We're happy to offer you the content you need to run your organization more efficiently. Please log in as described below.

1. Go to www.cbancnetwork.com. Click the *Members Login* button in the top right corner.
2. Routing #: 012345678
3. User Name: DSanders
4. Temporary Password: Ac59CgXt4d7W PLEASE NOTE: The above temporary password expires in 72 hours, so please log in within that period of time. You will then be prompted to change your password.

If you need assistance, please contact me or cbanc Support.

We look forward to having you as a member of our community!

*"Being able to pick up a policy that needs a little fine tuning with one hour's work compared with writing that same policy and investing 20 hours is 'priceless.' It's proven to be an excellent investment for our bank."*
*-Pat Johnson, Free State Bank*

Customer Support
cbancnetwork
Direct: (512) 697-3223
Cell: (512) 944-0518
Fax: (512) 343-8600
support@cbancnetwork.com
www.cbancnetwork.com Please don't print this e-mail unless necessary.

This message is intended for designated recipients only. If you have received this message in error, please delete the original and all copies and notify the sender immediately. Federal law prohibits the disclosure or other use of this information.

*FIG. 4D*

FIG. 4F cbanc
NETWORK
*where intelligence pays*

David Sanders  100 POINTS
Manage | Support | Client Zone
Sign Out

| My cbanc | Exchange | Answers | Vendor Review | Exam Watch | Topics | Surveys | App store |

+ Invite a Friend

Add Exam Watch | Edit Exam Watch | return to previous page

[ Search Network ]

Browse by Job Function

Exam Watch

[+700] 140 points for each question answered (700 total)
[+250] 50 points for each area of focus (250 total)
[+50] For allowing other members to ask you questions about this exam (250 total)

☑ Allow other members to ask me questions about this exam (anonymously)

Exam Watches are posted anonymously, neither your name or your financial institution's information will be shown.

| Examiner | Exam Type | Approximate Exam Date |
|---|---|---|
| Please select your Examiner ▾ | Please select your Exam Type ▾ | [____] |

Questions

For this exam, what areas of focus were you relieved you spent a lot of time preparing for?

[                    ]

Now that the exam is complete, what areas did you wish you had spent more time on?

☑ Allow other members to ask me questions about this exam (anonymously)
Exam Watches are posted anonymously, neither your name or your financial institution's information will be shown.

| Examiner | Exam Type | Approximate Exam Date |
|---|---|---|
| NCUA ▽ | GMSD ▽ | 1/24/2012 |

604

606

| Questions |
|---|
| For this exam, what areas of focus were you relieved you spent a lot of time preparing for? |
| Fair Lending Risk Assessment<br>BSA<br>Flood — 606a |
| Now that the exam is complete, what areas did you wish you had spent more time on? |
| Nothing. We were pretty well prepared. Risk Assessments, as always, help. — 606b |
| What exam questions did they ask that were unexpected? |
| There are always BSA/AML questions on the risk assessment. The nice thing is that we can substantiate it with the MLR results. — 606c |
| Based on how this exam went, what will you do differently to prepare for your next exam? |
| Prep myself on the Consumer Compliance Booklets before they walk in the door. It never hurts to be prepared. — 606d |
| In preparation for this exam, was there any work you did (such as a XLS, report, binder, etc) that really impressed the examiner? Please explain (and be sure and sell it on the Exchange). |
| We allow examiners access to our document imaging system, for loan file reviews (for Flood). They appreciate this. They also appreciate everything in an electronic format. — 606e |

FIG. 6C                                                    608

| | What were the Top 5 Focal Points from this exam, and what should your peers know about them? | |
|---|---|---|
| Rank | Area of Focus  608a | What should your peers know about this focal point?  608b |
| Ex: | Loan Loss Reserve | Prepare to spend time and money justifying what you have allocated, 2.5% to 3.5% of loan portfolio averages |
| 1) | HMDA | Zero tolerance for errors. |
| 2) | Reg. E Opt-in | If you sent a letter to your customers along with the opt-in form, the letter is being considered to be an advertisement. |
| 3) | Overdraft Protection Privilege Program | The FDIC really wants to see this program go away and they are scrutinizing every aspect. |
| 4) | Vendor Management | Be sure you are doing lots of due diligence on your credit card provider. |
| 5) | Fair Lending | Reach out to every segment of the low-moderate income population in your assessment area. Document, document, document. |

Before adding this Exam Watch, I understand the following:

In order to protect your privacy, your Exam Watch report is posted anonymously. cbanc does not review content you post, so to guarantee your anonymity, do not post any personally identifying information about yourself or your institution in your responses. Do not post any personally identifying information or make any personal commentary about your examiner. Exam Watch data may be packaged into abstract reports that third party companies can access for the purposes of improving their consultative services around exam preparations.

☑ I have read and agree with the terms and conditions

[Add Exam Watch]

cbanc
NETWORK
*where intelligence pays*

CBANC SUPER ADMIN | 38,114 POINTS

Manage | Support | Client Zone    [Sign Out]

My cbanc | Exchange | Answers | Vendor Review | Exam Watch | Topics | Surveys | App store Add Exam Watch | Edit Exam Watch |                         + Invite a Friend

[Search Network]                                          return to previous page

Most Recent Unread Exams — 702                    Browse by Job Function

Below are the most recent exams for regulatory agencies matching yur member profile (FDIC).
You can edit your regulatory agencies by clicking here.      Earn up to [+1000] points!

[Add Exam Watch]

FDIC - Compliance                                February 2012    Exam Search
exam posted by a MI Bank with between $250 million and $500 million in assets
                                                                  Regulatory Agency
FDIC - S&S                                       February 2012    [All ▼]
exam posted by a FL Bank with between $0 and $250 million in assets
                                                                  Exam Type
FDIC - Compliance                                February 2012    [All ▼]
exam posted by a MN Bank with between $0 and $250 million in assets
                                                                  [Search]
FDIC - BSA/AML                                   February 2012
exam posted by a MN Bank with between $250 million and $500 million in assets     704

FDIC - IT                                        February 2012
exam posted by a TX Bank with between $0 and $250 million in assets
                          706

Previously Read Exams

You have already read the exams below.

FDIC - S&S                                       February 2012
exam posted by a AL Bank with between $0 and $250 million in assets
                          708
FDIC - IT                                        February 2012
exam posted by a MO Bank with over $1 billion in assets

FDIC - Compliance — 752
February 2012  754  756
exam posted by a MI Bank with between $250 million and $500 million in assets For this exam, what areas of focus were you relieved you spent a lot of time preparing for?

We spent a lot of time of making sure our policies and procedures were up to date throughout the organization. Worked on new processes and hired outside third parties to handle flood insurance policies. In addition this past year we contracted with an independent outside compliance auditor to provide quarterly compliance reviews, which helped detect and correct errors.

Now that the exam is complete, what areas did you wish you had spent more time on?

Wish we spent more time in documenting our training. HMDA reporting training was also another area which we wished we spent more time in working with. Also, wished we contracted with our outside compliance auditor earlier.

What exam questions did they ask that were unexpected?

The examiner questioning our advertising, they found that we were not in compliance with our indoor signage rate board, which was missing the wording for our deposit accounts "See Bank Representative for information on terms and Fees".

Based on how this exam went, what will you do differently to prepare for your next exam?

Better documentation of our training efforts, excluding our on-line training modules. Examiners recommend more "face to Face" training with our staff rather than the "on-line" training.

In preparation for this exam, was there any work you did (such as a XLS, report, binder, etc) that really impressed the examiner? Please explain (and be sure and sell it on the Exchange):

The examiners were pleased to see that management had found errors and made corrections to processes before they arrived. There was nothing in particular they were impressed with.

| Area of Focus | What should your peers know about this focal point? |
|---|---|
| Mortgage Pricing and Fees. | Examiners recommended that we establish a system to monitor pricing and fees on mortgage loans to ensure that protected classes are not being priced or charged higher fees. |
| Flood Insurance | Verify that your coverage is sufficient. We had a few cases whereby the loan amount had increased due to modifications and no one realized to increase the policy at the time the loan amount was increased. |
| HMDA Reporting | Make sure that the HMDA report given to the examiners is throughly reviewed and scrubed. |
| Policies | Although we had good policies and procedures, we were cited for not having the "Protecting Tenants at Foreclosure Act" policy. |
| RESPA | Make sure that you have systems to detect and correct errors between you HUD-1 Settlement statement and the GFE. |

Recently Answered Questions

Below are the most recently answered questions.

NSF Notices
Have you discontinued sending NSF Notices to your customers? If so, are your communicating the NSF to them in a different format?....     910

FIS QualiFile (ChexSystems) Score Changes
With the recent scoring model adjustments for QualiFile, is anyone making any specific changes to your new account/product approval guidelines? It appears that there should be more declines for risk...

Deposit Resolutions to include Cash Management/Treasury Services?
Does anyone have an updated Corporate Authorization Resolution that includes Electronic Banking, Cash Management and or Treasury Services as one of the options or "powers granted"? Does your institut...

Who are bank's using for their physical security and bank equipment?
What vendor are you using for the physical security (video, alarm, secure entrances, etc.) and bank equipment (teller drawers, drive up tubes, safes) of your bank? We currently use a an independent c...     906

Most Viewed

Below are the most viewed questions and answers from the last 7 days.     908

Answers Needed
Calling all thought leaders! Help your peers by answering the questions below. If your answer is selected as the "best answer", you will receive cbanc points in return.

| | |
|---|---|
| Missing Check Endorsements... Worthwhile to Check or Waste of Time? | 14 answers |
| Anyone use iPad's or Tablets for Board of Director Meetings? | 17 answers |
| Experience with conversion to iPay | 4 answers |
| Special Account for Potential Customers who fail E-Funds/Check Systems | 7 answers |
| 100 points for best answer | |

| | |
|---|---|
| Mastercard Zero Liability | 0 points for best answer |
| Procedures after cash management customer PC compromise | 300 points for best answer |
| Donations or Goodwill Policy | 10 points for best answer |
| Safekeeping Customers' Securities | 50 points for best answer |

Ask Question

Banker's Toolbox

INSTANT BSA/FRAUD HEADACHE RELIEF

COMPLIANCE SOFTWARE
WIRE CONTROLS • RISK ASSESSMENT
BSA TRAINING • MONITORING SERVICES 4.75 Overall Rating on cbanc Network
☆☆☆☆☆ (READ THE REVIEWS ☆)

Answers Categories     904

Audit (14)
Back Office/Deposit Operations (59)
Cash Management/Treasury Services (31)
CEO/President (6)
Compliance/BSA/Legal (93)
Finance/Investments (9)
Human Resources (14)
Lending/Credit/Loan Admin (39)
Marketing (14)

Vendor Review — 922

You can search with either Product Type, Vendor Name or Product Name below, but not more than one at the same time.

For Vendor Name or Product Name, you can use any portion of vendor or product name. All searches are performed as a 'wild card' search.

Search by Product Type

[All Catergories ▼]

Search by Vendor Name or Product Name

[          ] [SEARCH]  — 924

Earn [+100] points!

[Write a Review]

Highest Rated — 928

| Core | |
| iCore DCI | ☆☆☆☆☆ |
| NuPoint CSI | ☆☆☆☆☆ |
| Horizon Fidelity | ☆☆☆☆☆ |
| Bill Pay | |
| iPay iPay | ☆☆☆☆☆ |
| CheckFree Fiserv | ☆☆☆☆☆ |
| iPay Q2 Software | ☆☆☆☆☆ |
| Internet Banking | |
| InSite Online Banking Automated Systems, Inc. | ☆☆☆☆☆ |

Recently Reviewed Products – Click on a product to view individual ratings.  — 926   930

| Product | INSTALL | TRAINING | CUSTOMER SUPPORT | FULL FEATURED | FEATURE REQUESTS | BUY AGAIN? | OVERALL |
|---|---|---|---|---|---|---|---|
| Document Scanning Fiserv | 4 | 4 | 5 | 4 | 1 | 4 | ☆☆☆☆☆ |
| Corporate Business Banking Digital Insight | 2 | 3 | 2 | 4 | Not Rated | 1 | ☆☆☆☆☆ |
| Director Fiserv | 4 | 4 | 4 | 4 | Not Rated | 4 | ☆☆☆☆☆ |
| Debit/ATM Card Processing Shazam | 4 | 4 | 5 | 3 | Not Rated | 4 | ☆☆☆☆☆ |
| Office Supplies Staples Advantage (a division of Staples Inc.) | 5 | 5 | 5 | 5 | 5 | 5 | ☆☆☆☆☆ |
| TriComply Trinovus | 5 | 5 | 5 | 5 | 5 | 5 | ☆☆☆☆☆ |

Fiserv – Document Scanning Review

| | |
|---|---|
| Reviewed By: | Troy, First Bank |
| Asset Size: | $116 million |
| Date Reviewed: | 04/22/2011 |
| Overall Rating: | ☆☆☆☆☆ |
| Call Me: | (979) 555-1212 |
| Email Me: | toltz@bankxyz.com |

⎫ 932

The reviews posted in Vendor Reviews are the statements of opinion of members of the cbanc network. Cbanc does not select, screen, approve or endorse the postings made by members in Vendor Review, and as a result, does not warrant or guarantee the accuracy thereof. All information contained in Vendor Review is provided on an "AS IS" basis without warranty of any kind, either express or implied, including, but not limited to, implied warranties of merchantability of fitness for a particular purpose. Cbanc reserves the right to remove any content or postings from this site.

Implementation Process Quality ☆☆☆☆☆ it was very painless

Training Process Quality ☆☆☆☆☆ very well thought out

Customer Support Quality ☆☆☆☆☆ support has always been quick to resolve problems

Features Are Useful And Complete ☆☆☆☆☆ complete

Responsive To Input On Product Development And Direction ☆☆☆☆☆ it does what the name implies and does it well.

Based On Your Experience, How Likely Is It That You Would Buy This Product Again? ☆☆☆☆☆

Very likely it is very user friendly

Click here to review this product.

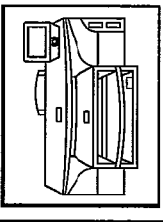
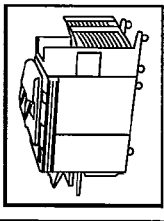
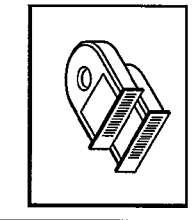
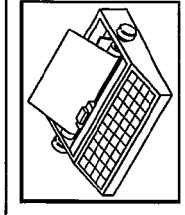

940

Jogger by Donna Schmidt, The Third Bank
Price: $Make offer

IBM 6400-05P Twinax & Coax Matrix Printer

Transporter by Donna Schmidt, The Third Bank
Price: $make offer

NCR iTran 300e 300DPM iTran 300e Base Unit MICR reader, Wise IP, 100 DPM Encode Front & Rear Imaging Flat Panel Monitor w/Touch Screen Merge Feeder Ink Jet Endorser Base High Speed Pocket Modules WiseIP Standalone Diagnostics Tape Drives by Donna Schmidt, The Third Bank
Price: $make offer Tape Drive: Ultrium III Tape Drive Tapes: 3 Maxell LTO Ultrium 3, 1/2" Tape Cartridge, 400 GB, 800 GB (compressed) 1 Dell Ultrium 3 Data Cartridge, 400 GB, 800 GB (compressed) 5 IBM Total Stoprage LTO Ultrium Data Cartridge, 400 GB, 8000GB (compressed)

Manual Typewriter -- Smith Corona Classic 12 by David Small, Financial Bank
Price: $40.00

Are you looking for a novelty item for your office? Then you will find it in this fully functional Smith Corona Classic 12 Manual Typewriter. Will accept $40 or best offer.

From: exchange@cbancnetwork.com [mailto:exchange@cbancnetwork.com]
Sent: Friday, March 02, 2012 10:15 AM
To:
Subject: cbanc: See How Your Peers Solve Problems in Today's Digest

---

Does your FI purchase and attend webinars?
Earn 200 cbanc points for sharing your 2012 webinar interests.
Login and click on the Surveys tab.

FRIDAY, MARCH 02, 2012
Congratulations! ⟶ 999

Will Rodgers from Test Bank gifted 200 points to your account yesterday!

Your Content (Funds Management Policy) was purchased 2 times yesterday! You have earned 200 cbanc points!

Your answer to the Question (ACH Risk Assessment) has been selected as the best answer! You have earned 50 cbanc points!

Your Content (Funds Management Policy) has been reviewed by one of your peers!

Your Question (Check cashing services) was answered 3 times yesterday! It now has a total of 3 answers!

John Snow was added as a cbanc user at your financial institution.

New Content ⟶ 1001

Conflicts of Interest Policy
Evan Adin, Grant County Bank

Popular Content ⟶ 1002

Sample Social Media Policy
Brad Green, Green Group

Questions Asked & Answered ⟶ 1008 iPad & iPhone Security
7 answers

Popular Questions ⟶ 1010

Anyone use iPad's or Tablets for Board of Director Meetings?
17 answers

Reviews Of Products You Own ⟶ 1012

Vendor Review
cbanc

Popular Product Reviews ⟶ 1014

Check Image Exchange
United Bank

New Exam Watch Surprises ⟶ 1016

They were interested in the number of shareholders, and makeup of shareholder base...

Popular Topic Analyses

Stress Testing
Michelle Lane
Bankers Box

---

1004
NEW SURVEYS

2012 Webinar Interests
200 cbanc points offered for completing this survey.

1006
OUR NEWEST MEMBERS!

(NY) Community Bank
(TX) Texas Bank
(VT) The Bank

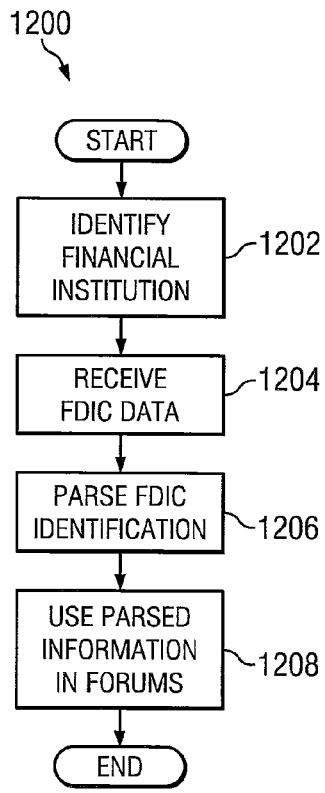
FIG. 12
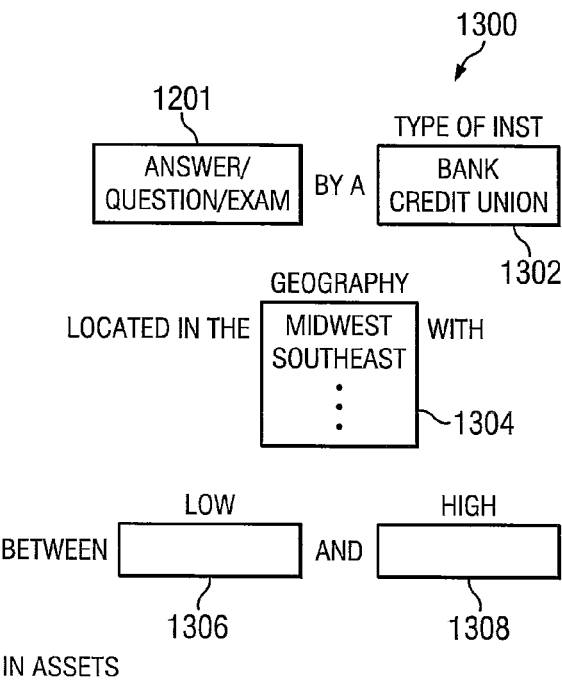
FIG. 13
1402
Reviewed by: John Smith
            First Bank
Asset size: $115 million
Date reviewed:
Overall rating:
Call me: (555) 555-1212
Email me: johnsmith@bankbank.com
1404
Reviewed by a bank
located in the Midwest
with between $100 million
and $200 million in assets
FIG. 14

| My cbanc | Connect | Analyze | Surveys | Webcasts |

Connect 1702

Members come to cbanc when they need accurate banking information. Connect gives you the tools to interact with the cbanc membership at the exact moment that they are looking for answers. Sharing you industry knowledge helps bankers solve problems and it creates a positive association with your brand.
Post Content to the Exchange.
Add new analysis to a Topic.

Get Leads

Your participation in Connect provides a valuable opportunity for lead generation. The companies below are the most viewed companies in cbanc. Their views are high because they have completed their profiles, posted content, answered questions and encouraged customers to write reviews about their products. Members can request to be contacted by your company via your profile.
  Most Viewed Companies 1706
  2) Wolters Kluwer Financial Services
  1) Fiserv
  3) Jack Henry

CONNECT                              YOUR PROFILE

Product Reviews Influence Decision Makers

Compare the number of product reviews written about your products with the total number of reviews written in the network. Encourage your customers to write reviews about your company to improve your product ratings. 1710
  Reviews written about your products:      646
  Total network reviews written in last 90 days: 268
  Your total product review views:          1855
  Total network product review views:      15767
Learn how to improve your product ratings.

PRODUCT REVIEWS                     YOUR REVIEWS

Most Viewed Question

Below are the most viewed questions over the last 30 days. Click on a question to see how members are responding to industry issues, and add your voice to the conversation by answering the question.
  Online Banking Password Controls
  Views: 169
  Answers: 14
  Cashier's Check Monitoring    1712
  Views: 142
  Answers: 5

Analyze 1704

Valuable knowledge is trading hands in cbanc every day. cbanc Analyze organizes these transactions so you can see which topics and issues are important to banking professionals. Analyze gives you access to real-time graphs and charts that can be filtered demographically by asset size, region, and job function. The intelligence you find here will help you with webinar education, product resource decisions, developing your consulting direction, and understanding the market perception of your company.

cbanc's Engaged Community

Total Members: 3813      Total Users: 8183

☐ West
  ☐ Midwest
  ☐ Southwest
  ☐ Northeast
  ☐ Southeast 23.2%  14.1%  35.2%  13.2%  14.1%

1708

MEMBER                              BROWSE
DEMOGRAPHICS                   DEMOGRAPHICS

What is happening around a specific topic?

Enter keywords (i.e. Risk Assessment or ACH, etc.) to find out what is happening around that topic in the Network...

Keywords: [          ]                    [Go]
                    1714

ANALYZE

Most Searched Terms cbanc members come to cbanc first when they need banking related information. The word cloud below shows the most searched for terms over the last 90 days:

ach Ach Policy  ach risk assessment  ALLL bsa
fair lending risk assessment  FFEC  foreclosure policy  internet banking risk assessment
Mobile Banking  online banking risk assessment  Remot Deposit Capture
risk assessment  SAFE Act  vendor management

1716

| My cbanc | Connect | Analyze | Surveys | Webcasts | cbanc cbanc ⸺ cbanc is a free, secure online community where bank and credit union professionals can ask, answer and share industry-related information – making it the largest repository of banker-authored, board-approved, exam-tested content on the Internet. Using points instead of dollars, FI's save valuable and time and money by pooling their information related to policies, due diligence of vendors, regulatory exam prep, and any other solution that helps institutions operate more profitably and efficient! ⸺ 1802

Helpful Links ⸺ 1804

Online Training

Product & Reviews ⸺ 1806

Vendor Management
Collaborative Network

| Install | Training | Customer Support | MEMBER OWNERSHIP | 33 | OVERALL RATING ★★★★★ 6 reviews |
|---|---|---|---|---|---|
| ★★★★★ | ★★★★★ | ★★★★★ | Full Featured ★★★★★ | | Feature Requests ★★★★★ Buy Again? ★★★★★ | read reviews

CBANC Exchange
Collaborative Network

| Install | Training | Customer Support | MEMBER OWNERSHIP | 4351 | OVERALL RATING ★★★★★ 363 reviews |
|---|---|---|---|---|---|
| ★★★★★ | ★★★★★ | ★★★★★ | Full Featured ★★★★★ | | Feature Requests ★★★★★ Buy Again? ★★★★★ | read reviews

Vendor Review
Collaborative Network

| Install | Training | Customer Support | MEMBER OWNERSHIP | 4350 | OVERALL RATING ★★★★★ 350 reviews |
|---|---|---|---|---|---|
| ★★★★★ | ★★★★★ | ★★★★★ | Full Featured ★★★★★ | | Feature Requests ★★★★★ Buy Again? ★★★★★ | read reviews

Due Diligence
Collaborative Network

| Install | Training | Customer Support | MEMBER OWNERSHIP | 13 | OVERALL RATING Not Rated |
|---|---|---|---|---|---|
| | | | Full Featured | | Feature Requests Buy Again? |

Company Info ⸺ 1808

9430 Research Blvd. Building IV,
Suite 120
Austin, TX 78759
www.cbancnetwork.com 🅢 Twitter

*FIG. 18*

1905 — Click the *Answer Question* button to add your voice to the conversation. You can also click the
1902 — *see more details* link to view data about the types of members that are viewing and answering the question.

1902 — Online Banking Password Controls

Online Banking Password Controls [ FOLLOW THIS ]
asked by a Bank located in the Midwest
with between $500 million and $1 billion in assets We are interested in knowing what other banks are doing for
password controls in Online Banking. How often do you require
customers to change their password? What kind of strength do
you require, and it is forced (such as requiring symbols,
upper-lower case, # of characters, etc.)?
14 answers

[ Answer Question ] — 1901    1907 — [ See More Detail ]

This question has been answered successfully with 14 answers.

Selected Answer

Posted: 01/25/2012
answer by a Bank located in the Southeast ★ Best Answer
with between $500 million and $1
billion in assets We require our clients to change their password every 90 days.
We also require between 8-14 characters of which there needs
to be one special character, one upper and one lower case
alpha as well as at least one numeric. We also use Enhanced
Login Security and Challenge Questions that can be answered
if the client forgets their password.

1903a

Additional Answers (13)

Posted: 01/25/2012
answer by a Bank located in the Southwest
with between $0 and $250 million in assets 1903b

Views by Asset Size 1904

26%  18.6%
     20.6%
34.8%

☐ between $0 and $250 million
☐ between $250 million and $500 million
☐ between $500 million and $1billion
☐ over $1billion
1909
[ Get Weighted ] [ Get Unweighted ] [?]

Job Functions 1906

36.8%  6.7%  9.7%
       19.3%

☐ Audit
☐ Back Office/Deposit Operations
☐ Cash Management/Treas...
☐ Compliance/BSA/L...
☐ Finance/Investments
☐ Human Resources
☐ Lending/Credit/Loan Admin
☐ Other (Trust, Faciliti...
☐ Retail Banking/Bran...
☐ Risk Management
☐ Technology
☐ Vendor Managemen...

[ Related Products ]
1910

Total Unique View

CBANC Exchange Review ~2002

Date Reviewed: 04/13/2012 } 2004
Overall Rating: ★★★★★

Implementation Process Quality ★★★★☆  ~2006
I was very pleased with the process of joining.

Training Process Quality ★★★★★  ~2008
Individual training was very nice and unexpected. The trainer was very helpful.

Customer Support Quality ★★★★★  ~2010
Haven't used the support much. Any questions I've had have been very quickly answered.

Features Are Useful And Complete ★★★★☆  ~2012
Haven't used the system too much but have been pleased with what I have used so far.

Responsive To Input On Product Development And Direction ★★★★☆  ~2014
Been very open to comments and suggestions for improvement.

Based On Your Experience, How Likely Is It That You Would Buy This Product Again? ★★★★★  ~2016
Very likely.

Vender Response  ~2018

[ Save Vender Response ]

*FIG. 20*

| My cbanc | Connect | Analyze | Surveys | Webcasts |

| Home | Segmented Behavior | Member Demographics |

REAL-TIME INTELLIGENCE — 2200

Valuable knowledge is trading hands in cbanc every day. cbanc Analyze organizes these transactions so you can see which topics and issues are important to banking professionals. Analyze gives you access to real-time graphs and charts that can be filtered demographically by asset size, region, and job function. The intelligence you find here will help you with webinar education, product resource decisions, developing your consulting direction, and understanding the market perception of your company. Use the filter sets below to see how specific member types are using the network. You can also click the Segmented Behavior link in the submenu to see how members search for and view content, questions/answers, and company reviews.

What is on the minds of cbanc users? — 2204

All Job Functions ▾ in Banks and CUs ▾ with All Asset Sizes ▾ in All Regions ▾ cares about... [Go]

What is happening around a specific topic?

Enter keywords (i.e. Risk Assessment or ACH, etc.) to find out what is happening around that topic in the Network....  2206

Keywords: [_____] [Go]

Most Searched Terms cbanc members come to cbanc first when they need banking related information. The word cloud below shows the most searched for terms over the last 90 days:

2208 ach ach policy
ach risk assessment Capital Plan
capital policy compliance risk assement ffiec
ffiec authentication mobile banking
remote deposit capture
risk assessment SAFE Act Audit
social media UDAAP vendor management

Who is looking at my reviews? — 2210

There are 42 views of my 719 product reviews over the last 30 days.

What real-time exam intelligence are members reporting? — 2212

Browse these comments for insights on real life pain points from members' regulatory exams. Click on a comment to see the full exam watch report.
Quite the opposite, we were surprised that they did not do any one-on-one staff interviews other than with Senior Manage...
Exam Type: Compliance
None.
Exam Type: S&S
None
Exam Type: BSA/AML
None
Exam Type: Compliance
They asked if we had recently completed an internal review of our credit card processor.
Exam Type: Compliance
n/a
Exam Type: Compliance
Liquidity – bank is overly liquid and has policy and procedures in place.
Exam Type: S&S return to previous page

Home | Segmented Behavior | Member Demographics |             return to previous page

Exchange Content Views and Purchases

The cbanc Exchange is the marketplace where cbanc members buy/sell work that they've created using a virtual currency called cbanc points. Use the search function below to gain insight into which issues are important to members based on their content views and purchases. Click on content titles to see detailed graphs and charts that break down content views and purchases by asset size, job function, and region.

Document Title: [ ]

Region: [All ▾]

Asset Size: [All ▾]

Date Range: [90 days ▾]

Institution Type: [All ▾]

Job Function: [All ▾]

Purchases By Asset Range

☐ between $0 and $250 million
☐ between $250 million and $500 million
☐ between $500 million and $1 billion
☐ over $1 billion (Pie chart: 27%, 28%, 24.8%, 20.2%)

Purchased Content

The following exchange listings have been purchased within the past 90 days. Please use the criteria fields above to expand or narrow your results.

| Result (876 total) | Purchase Count |
|---|---|
| Sample Social Media Policy | 125 |
| FDIC Compliance Management Program | 93 |
| FFIEC Authentication Risk Assessment / Training Packets / Project Plan | 84 |
| Sample Customer Security Message for new FFIEC Guidance | 67 |
| Reg CC - Exception Holds Chart | 52 |
| Vendor Info Request Letter and Form | 50 |
| Agreement | 49 |
| ACH Origination Activity Annual Board Reporting | 45 |
| Remote Deposit Capture Annual Customer Audit and Training | 35 |
| Mobile Banking Risk Assessment | 33 |

Content Views

The following exchange listings have been purchased within the past 90 days. Please use the criteria fields above to expand or narrow your results.

| Result (1315 total) | View Count |
|---|---|
| FFIEC Authentication Risk Assessment / Training Packets / Project Plan | 724 |
| Sample Social Media Policy | 525 |
| Reg CC - Exception Holds Chart | 390 |
| FDIC Compliance Management Program | 387 |
| Sample Customer Security Message for new FFIEC Guidance | 328 |
| Fair Lending Risk Assessment | 271 |
| E-banking risk assessment | 268 |
| REAL ESTATE EVALUATION (In-House) | 236 |
| Remote Deposit Capture Annual Customer Audit and Training | 236 |
| ACH Origination Activity Annual Board Reporting | 211 |
| Mobile Banking Risk Assessment | 207 |

FIG. 22C

| My cbanc | Connect | Analyze | Surveys | Webcasts |

Home | Segmented Behavior | Member Demographics | return to previous page

FFIEC Authentication Risk Assessment / Training Packets / Project Plan  [See content views data]

Use the filter sets and checkbox functions below to see the types of members that purchased this content.

2250

Over the last [90 days ▼]
[All Job Functions ▼] in [Banks and CUs ▼] with [All Assett Sizes ▼] in [All Regions ▼]  [Go]

☐ Purchase Frequency Total   ☐ Purchase Frequency By Region   ☐ Purchase Frequency By Asset Range
☐ Region Breakdown   ☐ Assett Range Breakdown   ☑ Job Function Breakdown Breakdown by Job Function — 2254

2252
☐ Audit
☐ Back Office/Deposit Operations
☐ Cash Management/Treas...
☐ Compliance/BSA/L...
☐ Finance/Investments
☐ Lending/Credit/Loa...
☐ Marketing
☐ Other (Trust, Faciliti...
☐ President
☐ Retail Banking/Bran...
☐ Risk Management
☐ Technology
☐ Vendor Managemen...

Pie chart: 8.3%, 7.9%, 9.5%, 29.1%, 19.4%, 8.4%  — 2256

2258

Member Demographics of Content Purchases  [PM]

| FI Type | Asset Range | Region | Purchase Date |
|---|---|---|---|
| Credit Union | between $0 and $250 million | Southwest | 04/30/2012 |
| Bank | between $0 and $250 million | Midwest | 04/26/2012 |
| Bank | between $0 and $250 million | Midwest | 04/24/2012 |
| Bank | between $0 and $250 million | Midwest | 04/24/2012 |
| Bank | between $0 and $250 million | West | 04/19/2012 |
| Bank | over $1 billion | Northeast | 04/12/2012 |
| Bank | between $0 and $250 million | Midwest | 04/11/2012 |
| Credit Union | between $0 and $250 million | Southwest | 04/10/2012 |
| Bank | between $0 and $250 million | West | 04/05/2012 |
| Bank | between $0 and $250 million | Midwest | 04/04/2012 |
| Bank | between $0 and $250 million | Southwest | 04/04/2012 |
| Bank | between $250 million and $500 million | Midwest | 04/03/2012 |
| Bank | between $0 and $250 million | Midwest | 03/26/2012 |

SYSTEM AND METHOD FOR REGULATED COLLABORATION MARKETPLACE

TECHNICAL FIELD

This disclosure relates to a private social network and collaboration system and point-based incentivizing of posting of information by users in banking and related industries. In particular, this disclosure relates to a backstage pass to vendors of financial service products to bankers in a secure environment.

BACKGROUND

Connecting bankers to vendors of products used by banks and bankers has been problematic. One typical solution has been the unsolicited or "cold" sales call, wherein a vendor telephones a banker not previously personally known to him. This method, however, tends not to be successful and often only annoys the banker.

Another solution to encourage banker and vendor interaction has been via traditional meeting places like conferences and trade shows. This is an extremely expensive and inefficient way to generate leads. Games are devised to push the vendors and bankers together, such as bingo cards that force the bankers to walk by booths and get stamps. This superficial interaction yields minimal results for the vendors.

Public online sharing sites promise to give vendors access to bankers who, theoretically, are sharing and revealing their needs to each other through discussion forums. But the presence of the vendors causes the bankers to stop sharing their needs with each other, or leave the sharing site altogether, because the bankers do not want the unsolicited sales calls. Further, the open nature of social media platforms causes the bankers to either not share, or to simply leave the site altogether, thus leaving very little real community behavior for the vendor to act on or learn from.

SUMMARY

Embodiments described herein provide systems and methods for private, incentivized online collaboration and sharing by bankers of regulatory exam and other information, as well as limited access by third-party vendors. A private and secure online venue is established, in which each applicant banker is confirmed before they can join. The venue may include or implement an incentives-based collaboration platform that provides contributors with "rewards" for sharing their regulatory exam and other experiences. Third-party vendors are given a limited access to the venue, in which they are not privy to banker identities. In some embodiments, the source of the information is generalized in a manner to protect the identity of the contributing banker. In some embodiments, the identity of the contributing banker is maintained completely secret from the vendors as well as the bankers.

According to some embodiments, a collaboration system includes a banker collaboration platform offering a first degree of access, and a vendor collaboration platform that offers a second degree of access to the banker collaboration platform. Vendors are not allowed to directly contact bankers and bankers' identities are maintained secret from the vendors.

According to some embodiments, a system for online information exchange includes a first party platform on a network site in which one or more network-accessible private forums are maintained, the one or more private forums defining predetermined workflows for registered first party users of a network site, wherein information associated with identification of the registered first party users available to others of the registered first party users in at least some of the one nr more private workflows is restricted according to first predetermined criteria; a second party platform on the network site and communicatively coupled to the first party platform via the network, the second party platform regulating access by registered second party users to the information associated with identification of the registered first party users and to posts in predetermined ones of the one or more private workflows, wherein the regulating access is according to at least second predetermined criteria and wherein the regulating access comprises allowing and disallowing access to at least portions of the information or posts; and a control system communicatively coupled to the first party platform and the second party platform comprising a service provider for registering first and second party users.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 4A-FIG. 4G illustrate exemplary interfaces used in secure registration.

FIG. 6A-FIG. 6D illustrate exemplary user interfaces for submitting Exam Watch information.

FIG. 7A-FIG. 7B illustrate interfaces for viewing completed Exam Watch surveys.

FIG. 9A-FIG. 9E illustrate exemplary "free" areas of the secure collaboration system.

FIG. 10 illustrates an exemplary members-only email.

FIG. 12 depicts a flowchart illustrating operation of embodiments.

FIG. 13 depicts an exemplary header of parsed identification information.

FIG. 14 illustrates an example of full identification information and parsing thereof.

FIG. 17 depicts an exemplary vendor interface.

FIG. 18 depicts an exemplary vendor profile interface.

FIG. 19 depicts an exemplary vendor interface to banker services.

FIG. 20 illustrates an exemplary vendor review.

FIG. 22A-FIG. 22C illustrate exemplary analytic vendor interfaces.

DETAILED DESCRIPTION

Figure 1:
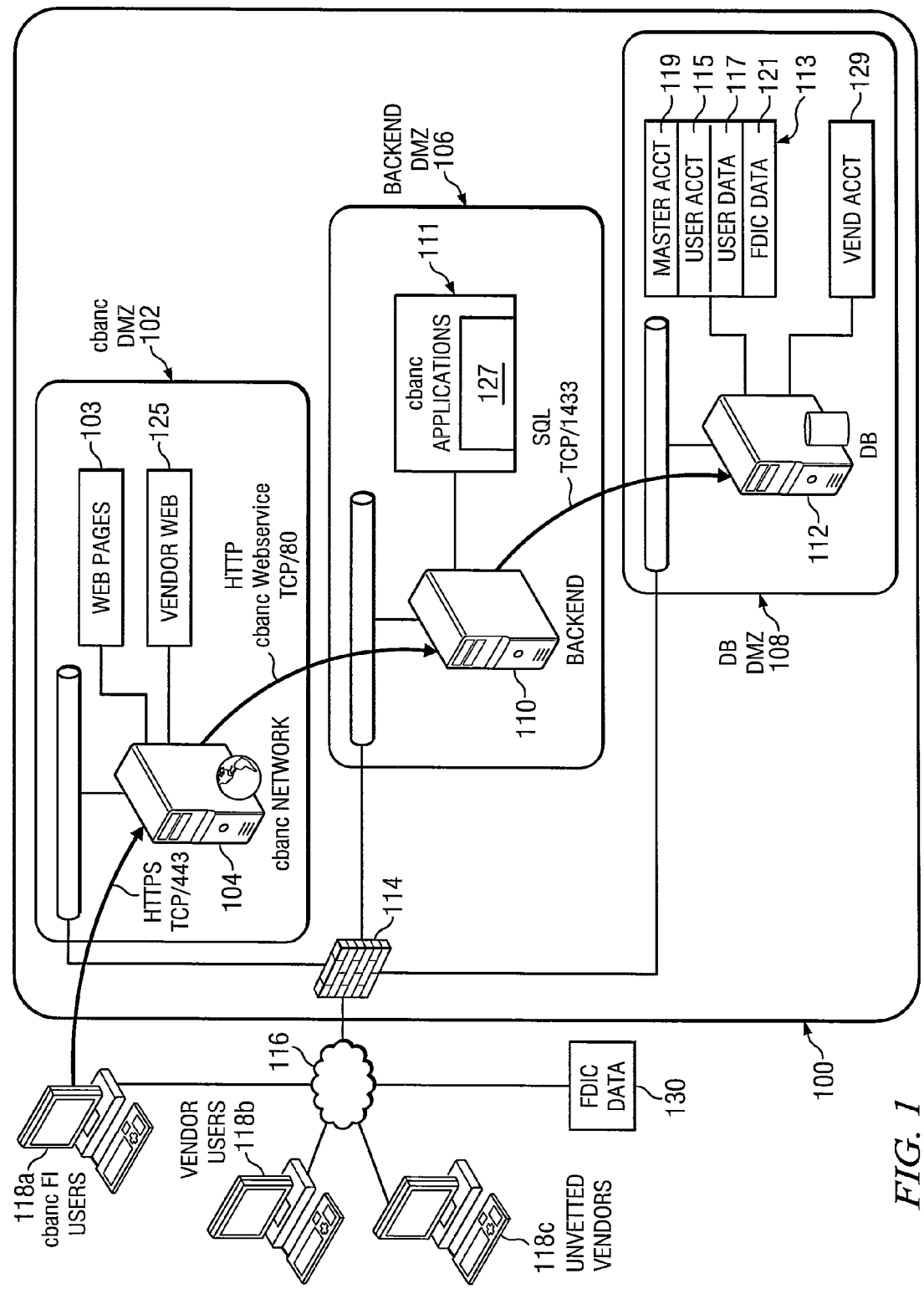
FIG. 1 depicts a diagrammatic representation of an example of one embodiment of a system for secure, incentivized collaboration.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

As discussed above, an online information sharing and collaboration system includes secure workflows for bankers to share information, and limited and secure access to that information by third-party vendors. Within this disclosure, the term "banker" refers to a representative of a financial institution, such as a bank or a credit union, regulated under the U.S. banking laws. A banker collaboration platform is provided that includes user verification mechanisms and systems and methods for incentivized sharing. A vendor collaboration platform is provided, which allows limited access to the banker collaboration platform. Advantageously, the vendor access is configured so as not to disincentivize use by the bankers.

As will be discussed in greater detail below, as used herein, a "member" may refer to a financial institution. Examples of a financial institution may include a bank, credit union, or the like. A "financial institution user" or "FI user" may refer to a registered, vetted banker with access to the banker collaboration platform. One example of an FI user may be an employee of a member. A "financial institution visitor" or "FI visitor" may refer to an unregistered, unvetted banker or other party, typically anonymous, who may visit the unsecure areas of the banker collaboration platform, such as prior to registration. A "vendor" may refer to a representative of a company or other organization that markets products or services to bankers. A "vendor platform visitor" may refer to an unregistered, unvetted vendor or other party who may visit the vendor collaboration platform prior to registration and/or vetting. An "unvetted vendor" may refer to a vendor who has registered with the vendor collaboration platform to access limited functionality, but who has not been vetted. A "vendor user" may refer to a vendor who has registered, been vetted, and who has paid to access the full spectrum of services from the vendor collaboration platform.

System Overview

FIG. 1 depicts a high-level diagram illustrating a secure collaboration system 100 in accordance with some embodiments. In the embodiment illustrated, the secure collaboration system 100 is communicatively coupled via one or more firewalls 114 to one or more networks 116. The one or more networks 116 may include the Internet, private and public networks, wired and wireless networks, etc.

One or more users 118 may access one or more portions of the secure collaboration system 100 using computing devices, such as personal or laptop computers, tablet devices, cellular telephones, smartphones, and the like. (In this figure, users 118 may comprise FI users 118a, vendor users 118b, or unvetted vendors 118c).

In the embodiment illustrated, the secure collaboration system 100 is implemented as three DMZ subnetworks 102, 106, 108. The term "DMZ" is derived from the term "demilitarized zone" and is used in computer security to refer to a physical or logical subnetwork that adds a layer of security to an organization's local area network. Subnetwork 102 may be in communication with, or accessed by, users 118 using secure protocols, such as https. The subnetwork 102 provides the banker platform web page interfaces 103 via one or more computing devices such as servers 104. In addition, one or more vendor platform web page interfaces 125 may be provided by the servers 104. As will be discussed in greater detail below, the vendors are not allowed the same level of access to all the data in the secure collaboration system 100 as the bankers.

The secure collaboration system's applications and web services 111 are provided using one or more back end servers 110 on subnetwork 106. As will be explained in greater detail below, such web services 111 can include user registration and handling of the various collaboration workflows and venues, as well as accounting for the incentives system. In addition, the applications 111 may include one or more vendor applications 127 configured to provide vendor access to the banker applications.

Subnetwork 108, in turn, may comprise one or more database servers 112, which maintain data 113, such as FI user collaboration account information 115, user data 117, and a master collaboration points account 119. In addition, as will be explained in greater detail below, the data 113 may include Federal Deposit Insurance Corporation (FDIC) bank data 121. This information is publicly available information downloadable from the FDIC 130 and includes information such as bank name, address, domain name, etc., and is used for verifying prospective registrants. Finally, the data may include vendor data 129, which can include vendor account data as well as one or more rules for accessing the banker user account data.

Banker Platform

As noted above, the secure collaboration system 100 can provide and maintain web services 111 implementing a banker collaboration platform comprising a plurality of venues or workflows through which FI users can earn and spend virtual collaboration points. In one embodiment, these collaboration points represent currency or a medium of exchange of the banker collaboration platform.

Figure 2:
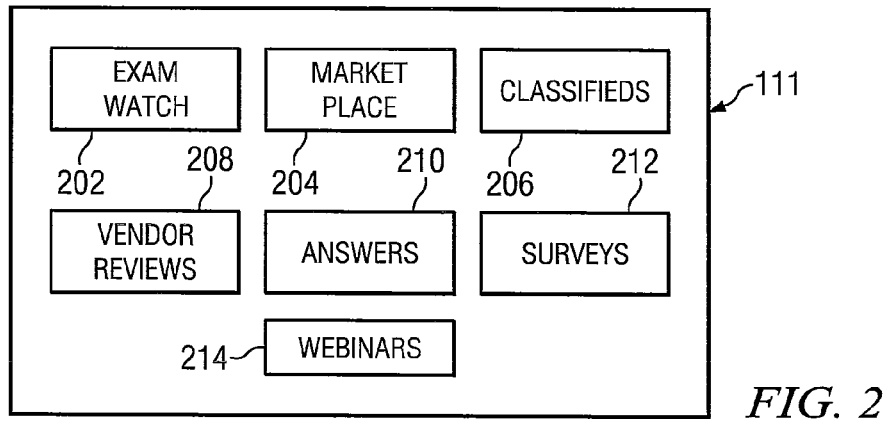
FIG. 2 depicts a block diagram illustrating example web services provided in the secure incentivized collaboration environment.

Exemplary web services 111 are illustrated in a high-level block diagram in FIG. 2. More particularly, shown are an Exam Watch service 202, a Market Place Exchange service 204, a Classifieds service 206, a Vendor Reviews service 208, an Answers service 210, a Surveys service 212, and a Webinars service 214. It is noted that in other embodiments, more or fewer services may be provided.

The Exam Watch service 202 may be configured to provide FI users of the secure collaboration system 100, further described below, a form to answer questions concerning a regulatory exam, perhaps recently-concluded.

As will be explained in greater detail below, the questions are designed to elicit information that is sufficiently detailed to be useful to other FI users, but not such that it would compromise the party or the financial institution giving the information. Furthermore, in the Exam Watch service venue, the identity of the FI user and member institution inputting the information is maintained secret. Rather, an asset range and a region (for instance, "Midwest") may be provided. The specific asset size and the exact location of the financial institution typically would not be disclosed. In some embodiments, in exchange for inputting the Exam Watch information, the FI user may earn collaboration points for himself and/or his financial institution. Other FI users can then browse the Exam Watch service 202 for information of interest to them.

The Marketplace service 204 may be configured to provide one or more workflows that allow FI users to upload documents or other deliverables defining best loan practices, policies, agreements, procedures, etc., and set a price in collaboration points. Other FI users can then purchase this information using the collaboration points.

The Classifieds service 206 may be configured to provide a workflow that permits FI users to offer items for sale, etc. These transactions may be consummated offline and involve real currency.

The Vendor Reviews service 208 may be configured to provide a workflow that allows FI users to submit reviews of vendors with whom they have had dealings. In exchange, they may receive predetermined numbers of collaboration points. Other FI users can then browse and/or comment on the reviews.

The Answers service 210 may be configured to allow FI users to post questions and set a number of collaboration points to be awarded to a best or most timely, etc., answer. Other FI users (and vendors, as will be discussed in greater detail below) can then browse and/or comment on the questions/answers.

The Surveys service 212 may be configured to allow the collaboration service provider to solicit information from FI users concerning matters that may be of interest to outside parties, such as vendors. Vendors may, for example, pay the collaboration service provider for distributing the survey. In exchange for answering a survey, the FI users may be awarded a predetermined number of collaboration points.

Finally, the Webinars service 214 may be configured to provide a venue for, say, vendors to provide information, education, training, etc., that may be of interest to FI users.

As noted above, an aspect of embodiments provides a secure environment such that financial institution professionals are confident that what they are saying and doing is private and secure from outside intrusion. To provide such privacy, embodiments implement secure registration and vetting of prospective registrants.

Figure 3:
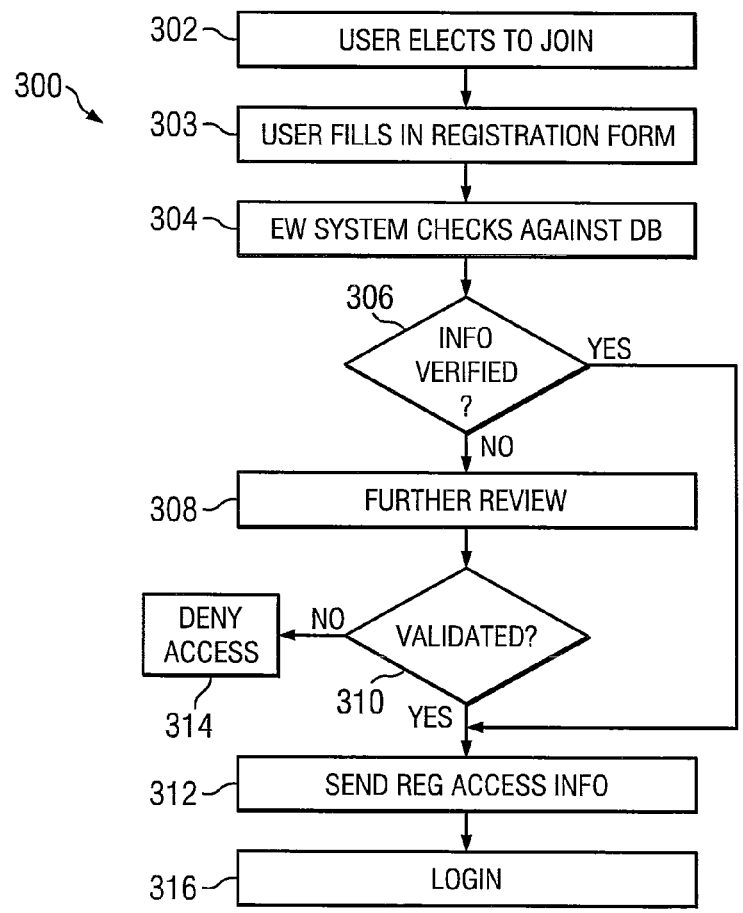
FIG. 3 depicts a flow diagram illustrating an example of one embodiment of a secure registration process.

An example of secure registration is illustrated in greater detail with reference to FIG. 3 and FIGS. 4A-4G. FIG. 3 depicts a flowchart illustrating a registration process according to some embodiments, while FIGS. 4A-4G depict graphical user interface windows provided during the process.

Figure 4A:
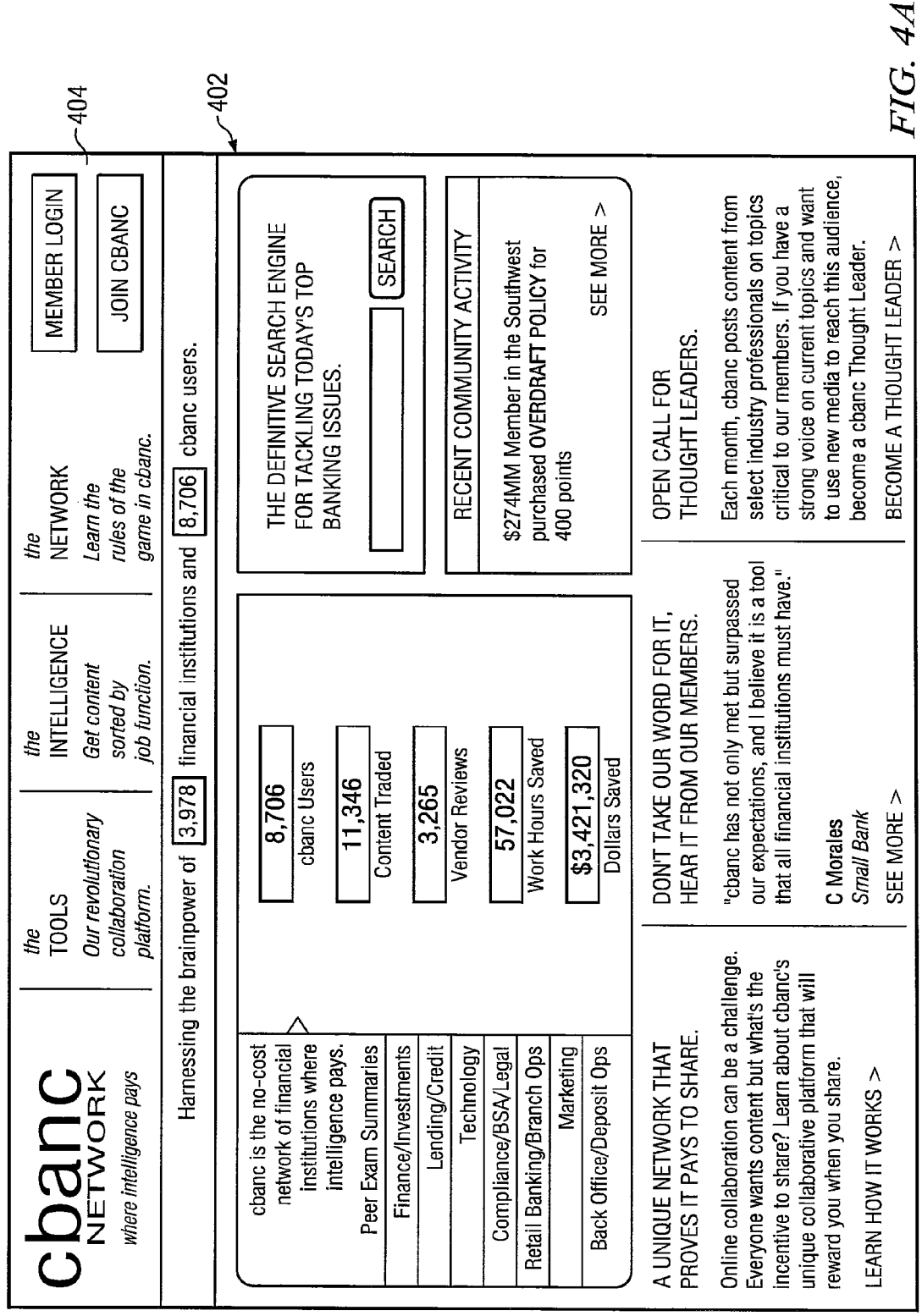

Initially (step 302) an FI visitor may use a web browser on a computing device 118 to access the communication service web page 103. An exemplary public web page 402 is shown in FIG. 4A. From the public web page 402, the FI visitor can log in if already a member or can click one or more buttons or other menu items 404 to join the secure collaboration service. Next (step 303), the FI visitor may be presented with a registration form and can fill in the corresponding entries. For example, as shown in FIG. 4B, the entries can include Name 410, Financial Institution Name 412, Routing Number 414, Email Address 416, Telephone Number 418, and optional fields such as Gift Card number 420 and Marketing Survey information 422 (Upon completion of registration and vetting, the registrant may be awarded collaboration points for completing the survey).

It is noted that, for purposes of security and to provide confidence in the membership, in more preferred embodiments, the registrant is not allowed to select a fictitious "user name."

The registrant is required to provide the financial institution name and a valid telephone number and email address, which are used to verify that the registrant is a current employee of a bank or credit union (step 304). In particular, the financial institution name, telephone number, and domain name are checked against the FDIC data (or data from other similar federally regulated, publicly accessible financial institution database(s)) that is downloaded on a periodic basis. Such information includes, for example, the institution name, its domain name(s), and names of the employees. The FDIC data may include all active financial institutions certified by the FDIC and may be stored in a database or table accessible by a computer implementing an embodiment of a registration system disclosed herein. In some embodiments, verification can additionally include sending an email to the entered address. Other steps may be employed.

If the information is verified against the database information (step 306), then the registrant becomes an FI user and may be presented with screen 420 (FIG. 4C), notifying him that login credentials will be sent via email.

If, in step 306, the information was not verified, a collaboration service moderator may be informed that further review is necessary (step 308). This may include the moderator emailing or telephoning the prospective registrant at the contact information provided. If the prospective registrant is still not able to be validated (step 310), then he will be denied access (step 314). Otherwise, he will be sent registration access information (step 312)

An exemplary email 430 showing login credentials is shown in FIG. 4D. In the example illustrated, login information includes a link to the appropriate collaboration service web page, and login information including the institution's routing number, a collaboration service defined user name, and a temporary password. According to some embodiments, the password expires if the new FI user does not log in within a predetermined period.

Figure 4E:
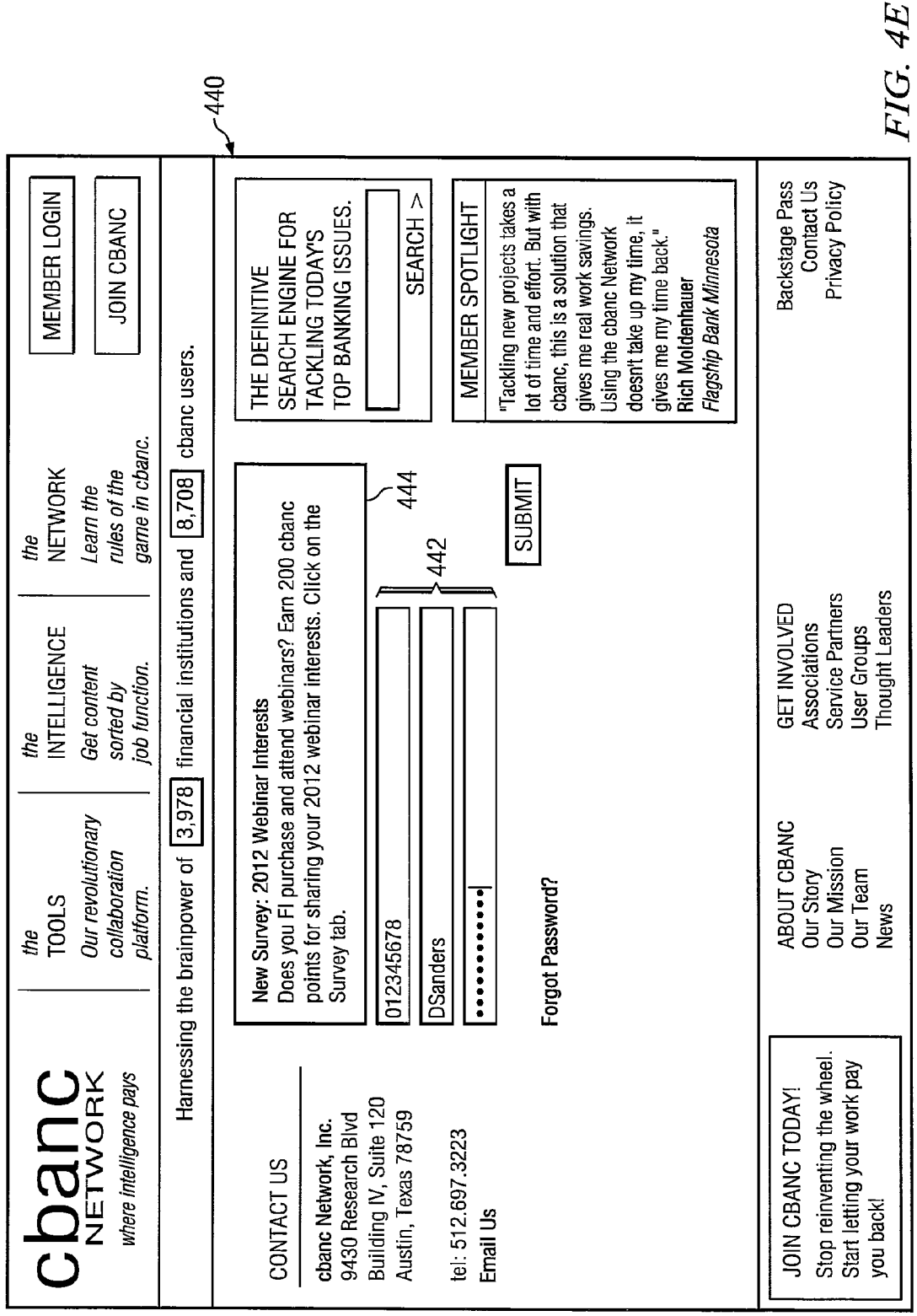

An exemplary login window 440 allowing the now-registered FI user to login for the first time (step 316) is shown in FIG. 4E. The login window includes form fields 442 for entering the information provided in the login email 430. In addition, in some embodiments, the login window can provide the new FI user with internal advertising 444 that will allow him to earn collaboration points in exchange for, e.g., completing a survey.

Figure 4F:
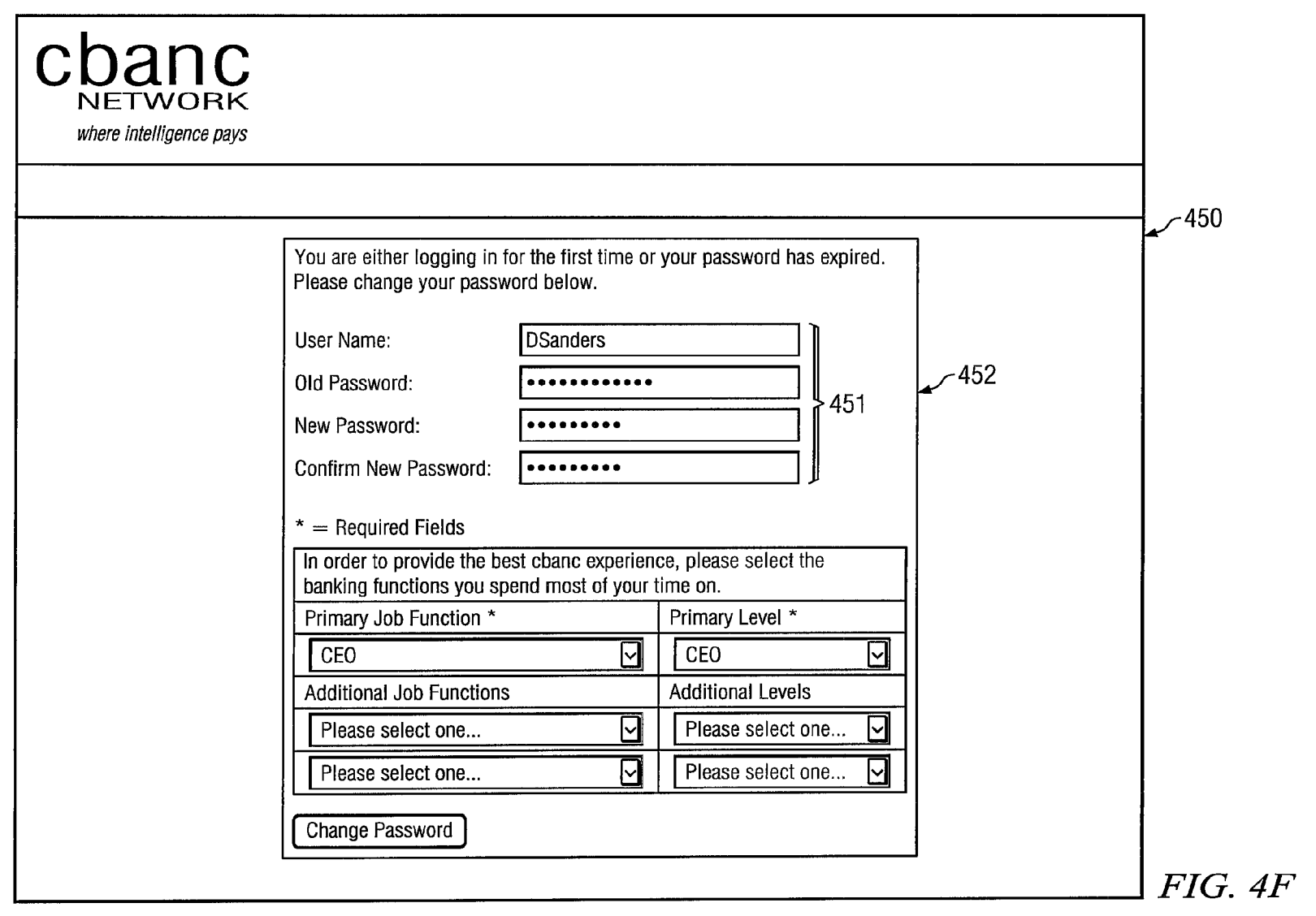
Figure 4G:
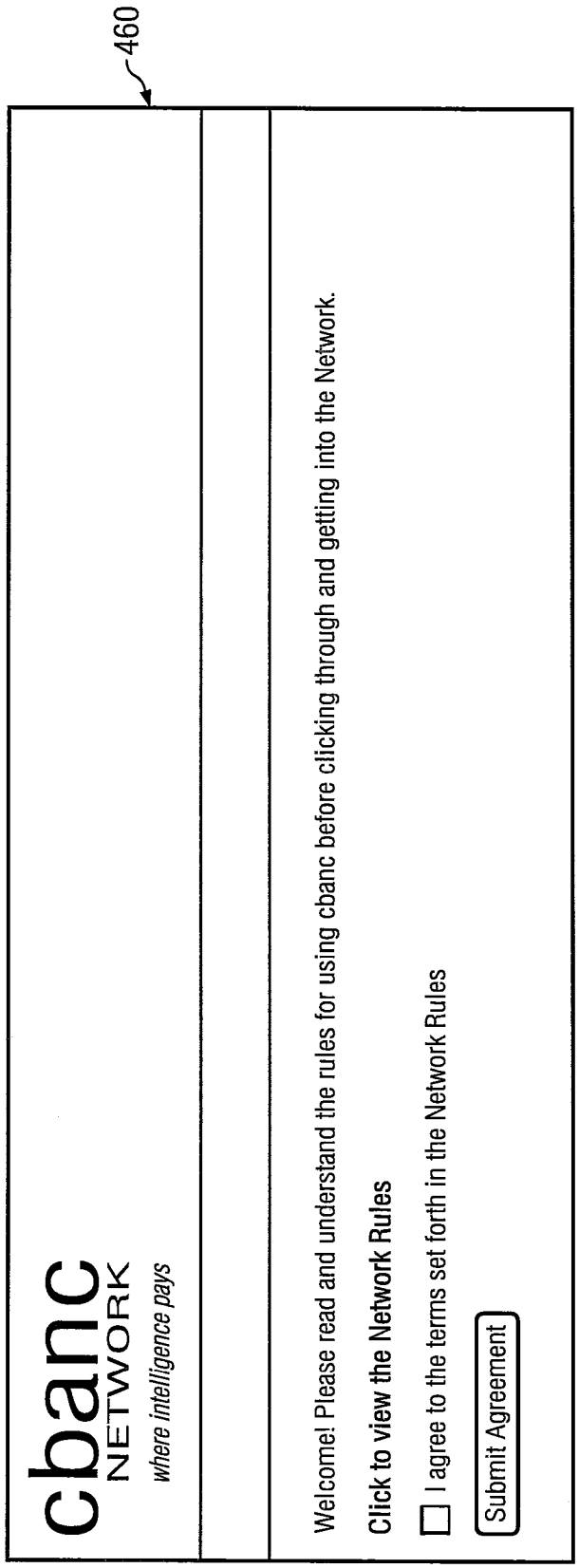

FIG. 4F illustrates a window 450 that requires the new FI user to change his password using fields 451 and that can also request the new FI user to define his banking functions with greater particularity 452. Exemplary job functions or titles include CEO, Audit, Back Office/Deposit Operations, Cash Management, Compliance, Finance/Investments, Lending/Credit/Loan Administration, Other (Trust Facilities), Retail Banking/Branch Operations, Risk Management, and Technology. Finally, as shown in FIG. 4G, the new FI user can be presented with an access screen 460 with a link to rules for using the collaboration system.

As noted above, an important aspect of described embodiments is incentivized collaboration and sharing. To this end, FI users are provided with opportunities to earn collaboration points, a virtual currency, that can be used to purchase information, etc., in the Marketplace 204 (FIG. 2). The collaboration system implements a master account 119 (FIG. 1) from which the collaboration points may be issued. In general, points are assigned to particular desired actions.

Figure 5:
FIG. 5 depicts a diagram representing an interface showing options for earning collaboration points.

FIG. 5 illustrates an exemplary screen 500 which defines some of the ways FI users can earn collaboration points. In some embodiments, the screen 500 is the initial screen the FI user sees when he logs in for the first time, and advantageously, provides ways he can take advantage of the collaboration system's services.

As shown at 502, an FI user can earn points by referring other FI user from within the user's institution. As shown, the FI user can earn 100 collaboration points for each such FI user (checked against the institution's domain name and/or tracking number). Similarly, as shown at 504, the FI user can earn 200 points for every new financial institution the FI user refers. As shown at 506, the FI user can earn up to 100 collaboration points for completing a vendor review. As shown at 510, the FI user can upload various work products to the Marketplace. The FI user may set a price for a work product. In addition or alternatively, the collaboration system may determine an appropriate price for the work product and suggest same to the FI user. As an example, the collaboration system may determine an appropriate price for the work product by comparing the work product with other similar work products offered by other FI users. The FI user may earn points when and if another FI user chooses to buy their work product. Similarly, at 512, the FI user can answer questions to earn "bounties" other FI users have set.

Finally, at 508, the FI user can earn the most points by completing an Exam Watch, to anonymously share the FI user's experiences with a recent regulatory exam.

It is noted that other ways may be provided for FI users to earn points (such as attending vendor webinars) and that the number of points earned can vary from those specifically illustrated herein. Furthermore, while associated with individual FI users in some embodiments, in others, the points are associated with a single account associated with the FI user's member financial institution.

In addition, in some embodiments, it is possible for FI users to "gift" points to other FI users. Typically, an off line transaction would occur, whereby one FI user agrees to something in exchange for a predetermined number of points, which he would then transfer to the other FI user. That is, his account would be debited and the other party's account credited.

The Exam Watch service 202 provides a questionnaire defining questions that allow FI users to describe the recent exam experience. In some embodiments, the Exam Watch is divided into a Question section, in which the FI user answers predetermined questions, and a Areas of Focus section, in which the FI user can volunteer a predetermined number of areas of focus that were of concern to the examiner. Points can be earned depending on the number of Questions answered and the number of Areas filled in. That is, each action may be assigned a particular number of points that can be earned if the FI user undertakes the corresponding action. In addition, in some embodiments, points can be earned if the FI user is willing to participate in one or more question and answer sessions or periods.

An exemplary Exam Watch window 602 is shown in FIG. 6A. As illustrated, the window can define the number of available collaboration points 601 and advise the FI user that the submission is anonymous—neither his name nor that of his member financial institution will be made public to other collaboration system FI users or members.

At 604, the FI user can enter or select the examiner, the exam type, and the approximate exam date. Exam types are classified by regulatory agency. In some embodiments, Exam types may include Trust, Community Reinvestment Act (CRA), Compliance, Information Technology (IT), Safety and Soundness (S&S), Bank Secrecy Act/Anti-Money Laundering (BSA/AML), GMSD, Registered Transfer Agent (RTA), etc. In some embodiments, Exam Watch Regulatory Agencies may include the Federal Reserve Board (FRB), the Federal Deposit Insurance Corporation (FDIC), the Department of Financial Institutions (DFI), the Office of the Comptroller of the Currency (OCC), the Office of Thrift Supervision (OTS), the National Credit Union Administration (NCUA), the National Credit Union Share Insurance Fund (NCUSIF), State Regulatory, etc. In one embodiment, an exam watch is categorized by a combination of a Regulatory Agency and an Exam Watch Type.

An exemplary Questions window is shown in greater detail in FIG. 6B and includes the anonymous query option 603, the exam identification information 604, and the Questions themselves 606. In one embodiment, the questions are kept to a minimum and are phrased to elicit maximum information without putting the member at risk. In the example illustrated, the questions are (1) For this exam, what areas of focus were you relieved you spent a lot of time preparing for? (606*a*); (2) Now that the exam is complete, what areas did you wish you had spent more time on? (606*b*); (3) What exam questions did they ask that were unexpected? (606*c*); (4) Based on how the exam went, what will you do differently to prepare for your next exam? (606*d*); and (5) In preparation for this exam, was there any work you did (such as an XLS, report, binder, etc) that impressed the examiner? Please explain (and be sure and sell it on the Marketplace/Exchange) (606*e*).

An exemplary Area of Focus page 608 is shown in FIG. 6C. As shown, the Areas of Focus are up to five areas selected by the FI user (608*a*) and to which the FI user answers the question "What should your peers know about this focal point?" (608*b*). Other embodiments may include differing number of areas of focus.

Once the form is completed, the collaboration system calculates the number of points to be awarded and displays the FI user's or member's earnings and balance, in a window 620

Figure 6D:
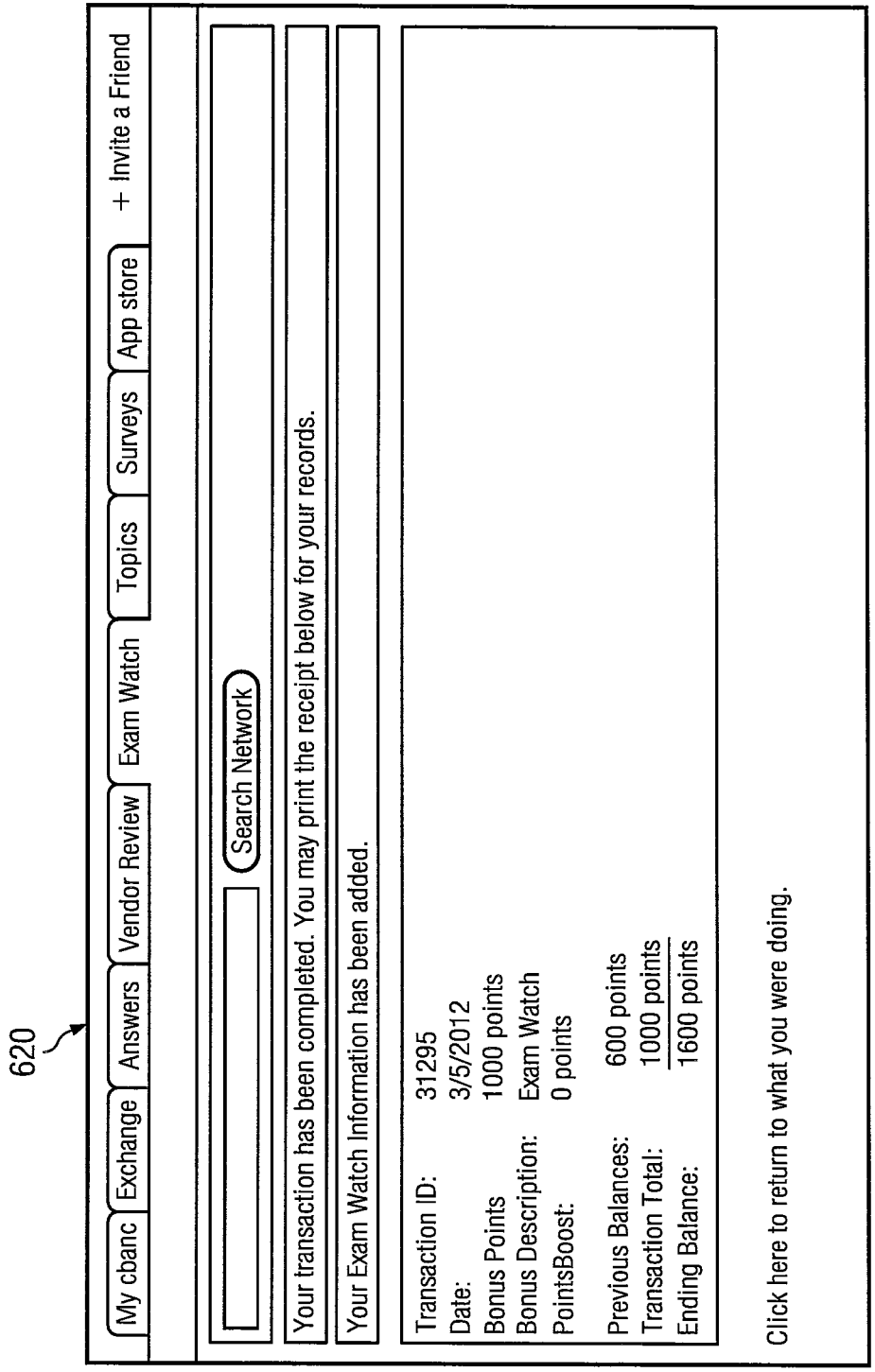

(FIG. 6D). It is noted that the exam questions may differ depending upon the agency or, indeed, the nature of the exam.

Further, while in some embodiments, answers must be at least three words long in order to earn points, and no individualized review is provided, in other embodiments, points may not be provided unless and until the answers have been vetted by a service provider moderator or other party.

Completed and uploaded Exam Watch exams may be viewed by FI users using the Exam Watch service. Typically, access to completed Exam Watch reports is free, although embodiments may differ. The exams may be arranged in a convenient manner for each FI user, such as by whether they have been read or not, by date, by exam type, etc.

An exemplary window 700 showing at least a partial catalog of available exams is shown in FIG. 7A. In the example illustrated, a list 702 of most recent unread exams is provided, categorized 706 by regulatory agency (e.g., FDIC) and exam type (Compliance, S&S, BSA/AML, etc.). Previously read exams 708 are also listed. In addition, in some embodiments, a search menu is provided whereby the FI user can search exams by, e.g., agency and type.

FIG. 7B illustrates an exemplary exam 750 as made available for reading. In the example illustrated, the exam is defined by agency and type 752 and includes the Questions 758 and Areas of Focus 760 portions. In addition, as noted above, the exam 750 anonymously defines the poster 756. That is, name and financial institution are not provided, although the state (754) where the institution conducts business is defined, as is the relative and approximate size of the institution's holdings. This generalized information does not specifically identify the poster 756 and yet provides sufficient details about the poster that can be useful to the reader. Depending upon the exam of interest, the level of generalization may vary.

As discussed above, the database 112 (FIG. 1) maintains both master 119 and FI user accounts 115 for collaboration points, which the applications and associated services 111 can access as necessary.

Figure 8A:
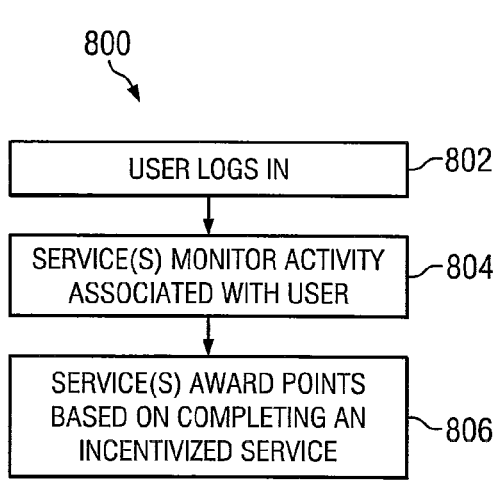
FIG. 8A-FIG. 8D depict flowcharts illustrating operation of embodiments.

FIG. 8A-FIG. 8D depict flowcharts illustrating account handling according to embodiments. Flowchart 800, as shown in FIG. 8A illustrates exemplary handling in general. Typically, a FI user may log in (step 802) in order for monitoring by a service to begin. Next, the service or system operates to monitor the activity associated with the FI user (step 804). This can include, for example, monitoring the FI user completing surveys, watching internal ads while logged in, or being identified as a referrer by other parties who are registering. Once the incentivized service is detected as being completed, the collaboration system will deduct collaboration points from the master account 119 and add them to the FI user account 115.

Figure 8B:
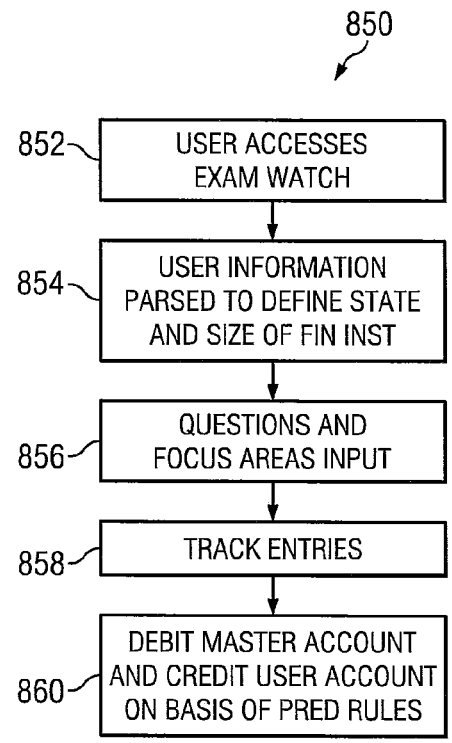

FIG. 8B illustrates a flowchart 850 showing awarding of points responsive to completion of an Exam Watch. At 852, the FI user may access the Exam Watch service, as described above. Next, the FI user information may be parsed to define the state and size of the member financial institution (step 854). In some embodiments, this information may be ascertained upon registration and thus stored with the FI user account information; thus parsing need not be done on an exam-by-exam basis. The FI user may then answer questions and provide inputs to each of the focus areas (step 856).

In response (step 858), the Exam Watch service tracks how many fields have had entries above a predetermined length (e.g., in some embodiments, one or two word answers will not be rewarded).

Once the FI user indicates that the exam is complete and submits the exam to the system, the Exam Watch service can cause the master account to be debited according to the allocation rules and credit the FI user account (or member account) correspondingly (step 860).

Figure 8C:
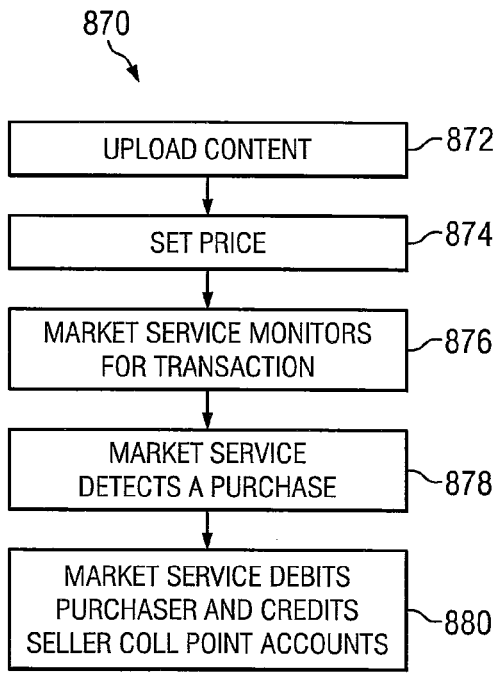

FIG. 8C depicts a flowchart 870 illustrating exemplary use of the Marketplace service. As noted above, once logged in, the FI user can upload content (step 872), such as best practices, IT policies, etc. Before the content is made available, the FI user can set a price for the content (step 874) or the Marketplace can assign a price for him. The Marketplace service can then monitor the transaction or item for a purchase request (step 878). Once a transaction is detected (step 878), the Market service can debit the purchaser account and credit the seller account (step 880).

Figure 8D:
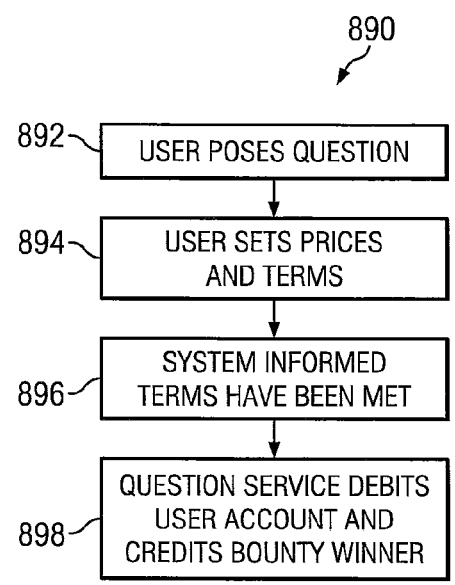

FIG. 8D depicts a flowchart 890 illustrating exemplary use of the Answer service. Initially, a FI user can pose and post a question (step 892). The FI user can set a bounty (price) and terms for the answer. For example, depending on the embodiment, the FI user can offer to pay for a best answer or a first answer, or a best answer within a particular time period. The Answer service can then monitor to see if the terms have been met (step 896). If so, then the Question service will cause the FI user account or corresponding member account to be debited and the bounty winner's account to be credited.

It is noted that, while in some embodiments, the collaboration points are tracked only on a per FI user basis, in other embodiments, they may be tracked on a financial institution (member) basis, or both. Further, while in the embodiments discussed above, the points are transferred from the master account to individual FI user accounts, and from FI user to FI user, in some embodiments, the only transactions can be between the master account and accounts belonging to the member financial institutions.

In addition to areas where FI users can earn points, the collaboration system provides many venues for viewing and networking that do not require expenditure of points.

Figure 9E:
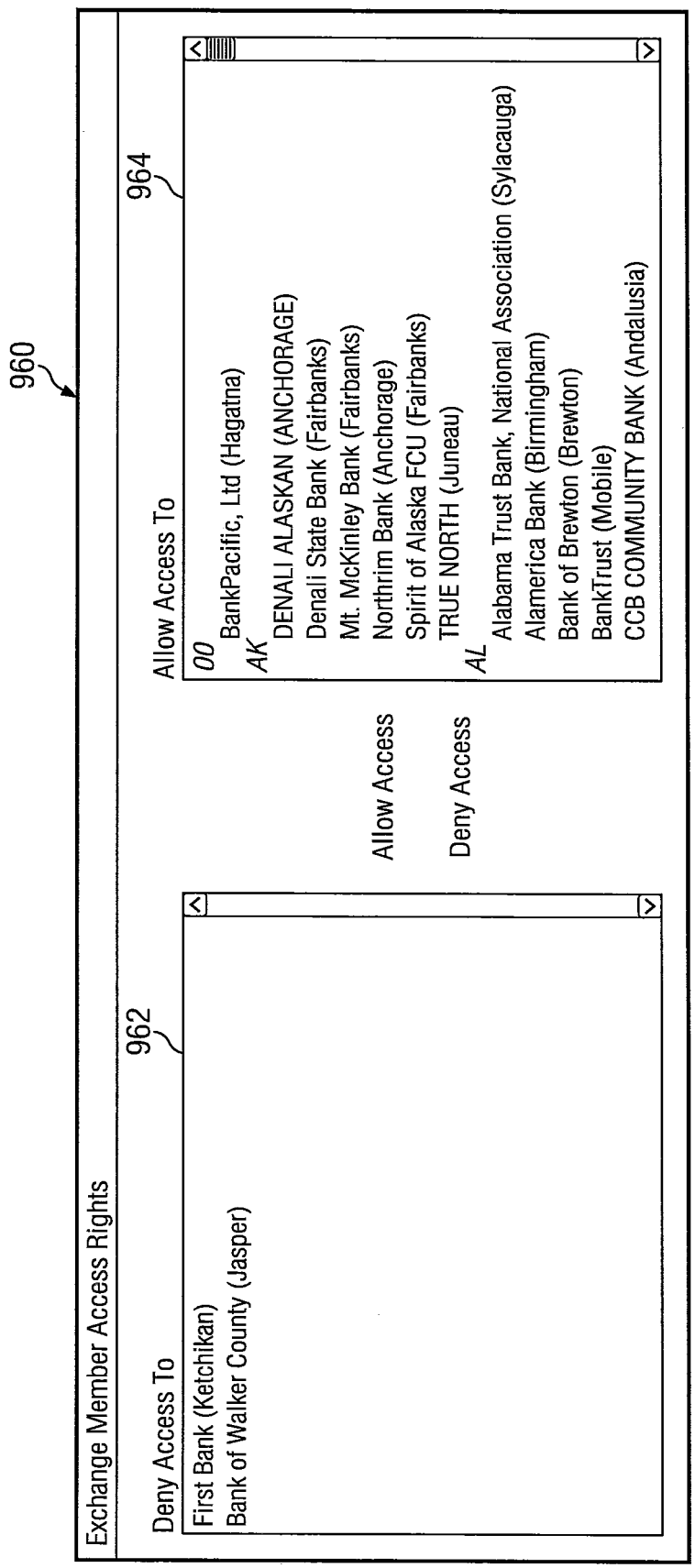

Some of these are illustrated in FIGS. 9A-9E. In particular, FIG. 9A illustrates an exemplary Answer service window 902. In the example illustrated, the FI user can view questions according to categories 904, see questions for which answers are needed 906, see most viewed 908 and see most recently answered 910. Typically, questions for which answers are needed are listed by the number of points being offered and the criteria for which points will be given (e.g., best answer). In addition, in some embodiments, various of the Answer pages and other content pages can include vendor product links (not shown) implemented using a Product Linking service 1114, as will be described in greater detail below.

In addition, some embodiments provide a Vendor review service which includes one or more windows 920 (FIG. 9B) for viewing vendor reviews that have been input by FI users. In the embodiment illustrated, the vendor review window includes a listing of highest rated vendors 928, an identification of searching capabilities 922, search by type pull-down 924, and search by name or product field 926. Recently reviewed products 930 may be listed chronologically.

An exemplary rating window 930 is shown in FIG. 9C. As shown, the review identifies the product and the reviewer 932. Predetermined fields allow FI users to enter ratings (5 star) and brief comments.

As shown at FIG. 9D, a Classifieds service window 940 allows FI users to view classified advertisements, e.g., items for sale, etc.

Finally, FIG. 9E illustrates an Access Rights window 960. The access rights window 960 includes a listing 962 of FI users who are denied access to the FI user's marketplace offerings and a listing 964 of those who are allowed access. This ensures that FI users feel comfortable that they are not granting immediate competitors access to their work products and provides an additional incentive for sharing and/or collaborating or otherwise participating in the secure collaboration network.

It is noted that these services are exemplary only and that others may be implemented. For example, in some embodiments, interviews by outside parties such as vendors may be posted for viewing by the registered FI users.

In some embodiments, the secure collaboration system may invite repeat visits by generating and sending periodic update emails. For example, such emails may be sent on a daily basis. One such exemplary email 1000 is shown in FIG. 10. The email 1000 can include a variety of links and/or information. In the example illustrated, this includes New Content 1001, Popular Content 1002, New Surveys 1004, Newest Members 1006, Questions Asked & Answered 1008, Popular Questions 1010, Reviews of Products You Own 1012, Popular Product Reviews 1014, and New Exam Watch Surprises 1016. In addition, in some embodiments, the email 1000 can include a message personalized to each FI user.

Vendor Platform

As noted above, in some embodiments, a vendor collaboration platform can be provided in conjunction with, and complementary to, the banker collaboration platform. As will be described in greater detail below, the vendor collaboration platform provides for limited access by vendor users to FI users and allows for real time data collection and for viewing of vendor reviews. In addition, in some embodiments, vendor users may upload information for use or sale to the FI users, but are not otherwise allowed direct access to the FI users. In some embodiments, vendor users may pay for differing levels or degrees of private messaging and/or product linking to FI users.

Figure 11:
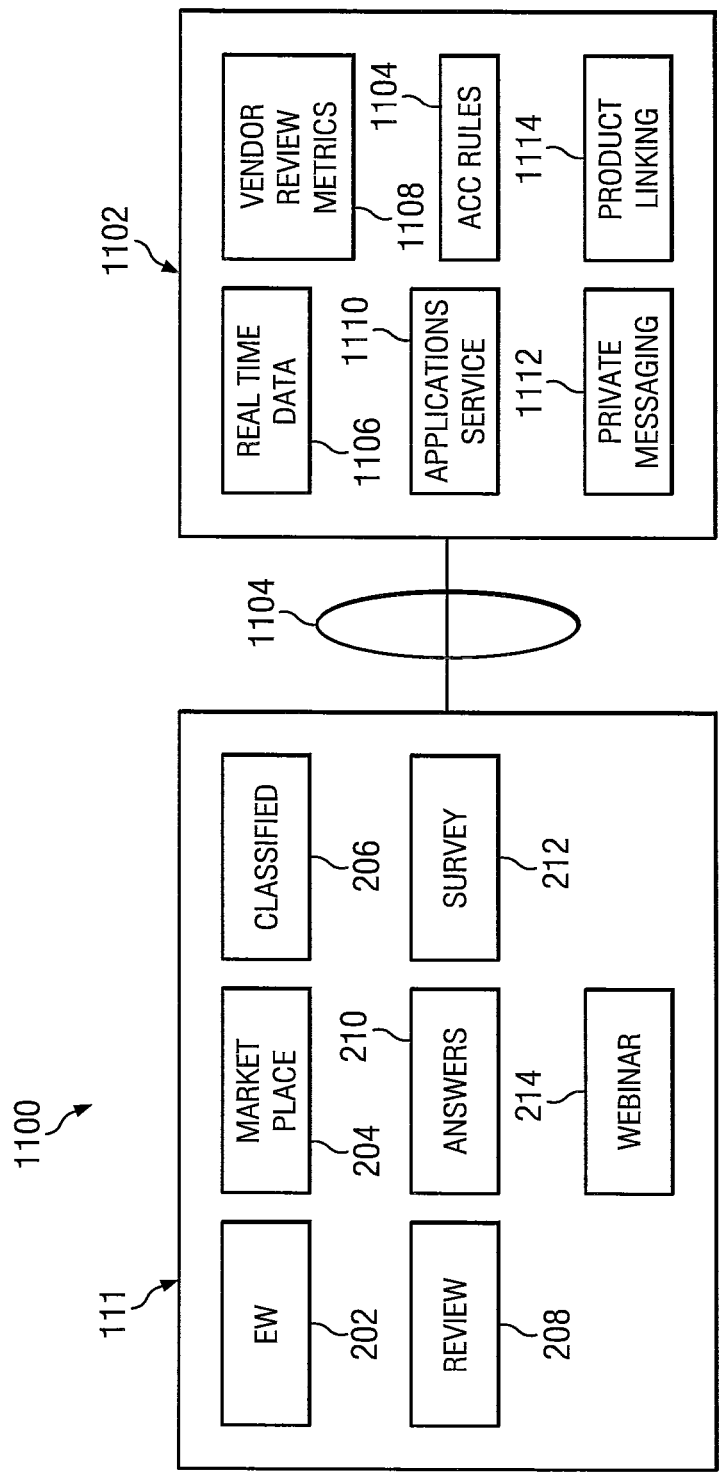
FIG. 11 depicts a diagrammatic representation of an example of one embodiment of a system for secure, incentivized collaboration and third-party interaction.

FIG. 11 is a block diagram illustrating a collaboration system 1100 including a banker platform 111 and a vendor platform 1102. The banker platform 111 may be an embodiment of the system described above with reference to FIG. 2 and may include an Exam Watch service 202, a Market Place Exchange service 204, a Classifieds service 206, Vendor Reviews service 208, Answers service 210 Surveys service 212, and Webinars service 214, as described above.

As shown in FIG. 11, a vendor platform 1102 may be communicatively coupled to the banker platform 111 and may include an Access Rules service 1104, a Real Time Data service 1106, a Vendor Review Metrics service 1108, an Applications service 1110, a Private Messaging service 1112, and a Product Linking service 1114.

The Applications service 1110 allows for interacting with various of the services on the banker platform 111, pursuant to the access rules defined by the Access Rules service 1104. In some embodiments, the Applications service 1110 provides an interface for vendor users to interact with various services provided by the banker platform 111. For example, in some embodiments, vendor users can view vendor reviews made by bankers using their Review service 208. In some embodiments, the vendor users may likewise view exams posted in the Exam Watch service 202, and may view and post Answers via the Answer service 210, as well as posting work product and/or other documents to the Marketplace 204.

In addition, in some embodiments, vendor users may earn collaboration points through the Marketplace 204, as well as by offering webinars to bankers using the Webinars service 214 and surveys to the bankers using the Surveys service 212. In addition or alternatively, in some embodiments, the vendor users may pay the collaboration service to deliver a survey or webcast, and the collaboration service can provide the FI user with collaboration points as an incentive to participate.

The Access Rules service 1104 defines vendor access to the various services of the banker platform. In general, in some embodiments, while a vendor user may be able to upload content (and receive collaboration points if that content is later purchased by an FI user), the vendor user is not allowed to know the identities of the FI users and is not able to push direct communications to the FI users. The Access rules service 1104 may interact with one or more similar services maintained by the banker platform 111. In some embodiments, the access rules are wholly provided by the banker platform 111.

The Real Time Data service 1106 collects data from the FI users' predetermined workflows and can present the data in a useable format to the vendor users. For example, as will be explained in greater detail below, it can display to vendor users most frequently asked questions and provide other information that can allow vendors to connect with FI users within the auspices of the collaboration system.

The Vendor Review metrics service 1108 allows vendor users to see and compare their performances as rated by FI users in the Vendor Review section 208 of the banker collaboration platform.

The Private Messaging service 1112 allows vendor users to pay to send private messages to the in-network message centers of FI users. As will be explained in greater detail below, the price may depend on the number of messages the vendor user wishes to send, the number of messages a given FI user has been receiving in a defined period of time, and the particular attributes of the FI user, such as bank size, region, job title, etc.

The Product Linking service 1114 allows vendor users to pay for a link on a given page in the banker platform 111, such as Exchange item, Answer, Exam Watch, Vendor Review, etc. Typically, the link is to a product or service being offered by the vendor user that relates to the content on the page. In some embodiments, as will be explained in greater detail below, a limited number of product links are provided, and vendor users may bid on a monthly basis to occupy a spot.

As discussed above, an aspect of incentivizing use of the banking platform 111 is that FI users can retain their anonymity and remain free from "cold calls" by vendor users. FIG. 12 is a flowchart 1200 illustrating a process for providing only predetermined portions of a FI user's or member's identification information while online. As noted above, such a process may be implemented using the Access Rules service 1104 or a similar service provided on the banker collaboration platform.

The collaboration system may identify a particular FI user and bank member, for example, using the information provided when the member registered (step 1202). The collaboration system can then access the FDIC database 130 (FIG. 1) (step 1204). As noted above, the FDIC database can provide information such as the bank name, location, holdings, subsidiaries, etc. The collaboration system can then parse the received FDIC information (step 1206) to obtain desired partial identification information. Finally, the collaboration system can use this parsed information to identify the FI user and/or member in one or more of the collaboration workflows (step 1208). As will be discussed in greater detail below, such information can include the type of institution, the geographical location, and the size of the bank.

For example, shown in FIG. 13 is an exemplary identification header 1300 that may identify a FI user in a particular workflow. As shown, the identification header includes fields that may be populated according to the information parsed form the particular FI user. An initial field 1301 can identify the workflow. For example, it can identify the post as a Question, an Answer, an Exam, etc. A next field 1302 may identify the type of financial institution. For example, the field 1302 may identify the institution as a bank or a credit union.

Another field 1304 may identify a geographical location of the financial institution. According to some embodiments, predetermined regions are defined: Midwest, Southeast, Southwest, etc. Finally, in some embodiments, the asset size of the financial institution can be defined using lower 1306 and upper 1308 bounds on the institution's assets.

As discussed above, such a presentation of identification may be used between FI users in the banker collaboration platform, as well as within the vendor collaboration platform. In addition, however, in some embodiments, different levels of identification are provided between FI users and vendor users. For example, in using the Vendor Review workflow implemented by the Vendor Review service 208, in some embodiments, an FI user may identify him/herself to other FI users by name, bank, and contact information. However, this information may be suppressed, when, e.g., the Real Time Data service 1106 or Vendor Review Metrics service present the data to the vendor users.

This is shown by way of example at 1402 in FIG. 14. As shown, a banker John Smith of First Bank has entered a review and left his telephone number and his email address so as to allow fellow FI users to contact him about the review.

In contrast, 1404 illustrates the identification that a vendor user would see of the same review: only the standard header with relevant fields populated.

Figure 15:
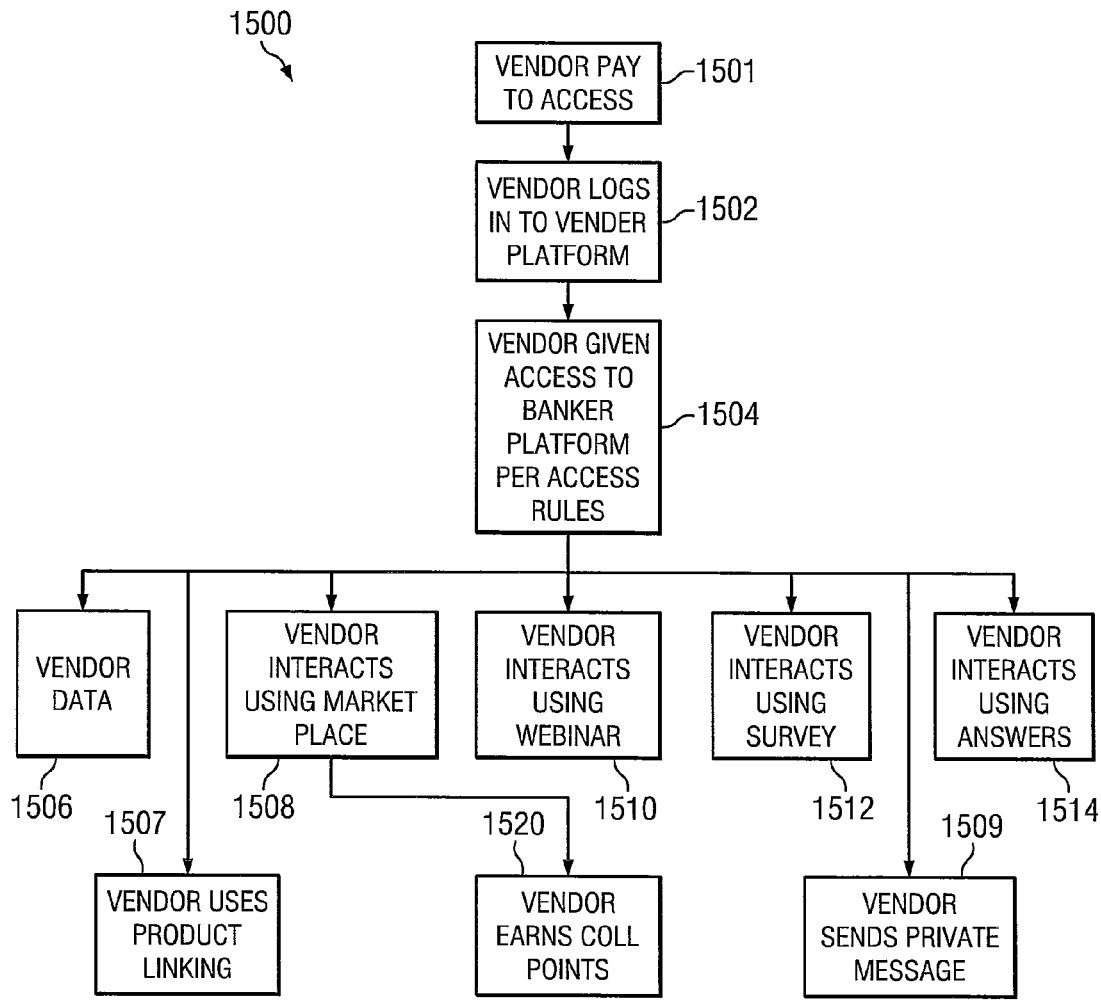
FIG. 15 depicts a flowchart illustrating operation of exemplary embodiments.

Turning now to FIG. 15, a high-level flowchart illustrating operation of embodiments is shown. In some embodiments, a vendor user may pay a collaboration service provider (i.e., an operator of the collaboration service) to access the vendor collaboration system (step 1501). This may include any kind of subscription fee, on an annual or monthly basis, for example, or on a per login basis, or on a per user basis. The vender fee in some embodiments is distinguished from banker access. In some embodiments, FI users do not pay membership fees. In some embodiments, a vendor user may be given an account with a predetermined number of collaboration points.

Once given access, in a manner similar to that discussed above with reference to the banker platform, a vendor user may log in at his convenience (step 1502). This may cause a tracking of his movements and access to the one or more workflows of the banker collaboration platform per the access rules (step 1504).

Per the rules, and as will be discussed in greater detail below, the vendor user may be given access to real time banker and vendor data via the Real Time Data service 1106 (step 1506) including, for example, Exam Watch data. In addition, he may interact with FI users using the Exchange Marketplace, in a manner similar to that discussed above with reference to FI users within the Marketplace (step 1508). The vendor user may also interact via the Webinar service (step 1510), the Survey service (step 1512), and the Answers service (1514). Using, e.g., the Marketplace service, the vendor user may earn collaboration points (step 1520), as will be discussed in greater detail below. Further, the vendor user may provide answers in the Answers service (step 1514). In addition, as will be discussed in greater detail below, a vendor user may pay the service provider to send private messages to FI users (1509), or to set up private links (1507) on particular ones of the pages seen by FI users via the banking platform 111.

Figure 16:
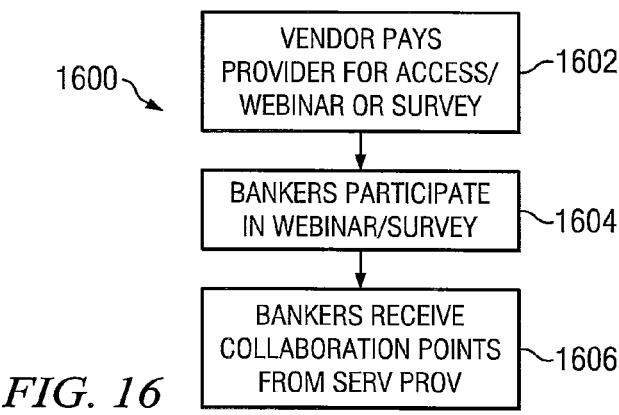
FIG. 16 depicts a flowchart illustrating operation of exemplary embodiments.

Turning now to FIG. 16, a flowchart 1600 illustrating vendor interaction is shown. As shown (step 1602), a vendor user may pay a subscription fee for access to particular services of the collaboration system. For example, a vendor user may pay a fee to view Answers or respond to Questions, to post a survey to the Survey service or pay a fee to host a webinar.

The FI users may participate in the webinar or survey (step 1604) and can earn collaboration points from the service provider for doing so (step 1606). In some embodiments, the FI users can also earn points from the sponsoring vendors.

Turning now to FIG. 17, a diagram of an exemplary vendor user interface 1700 is shown. In the example illustrated, the interface 1700 represents a vendor's ability to access the banker platform and data. In some embodiments, various topics may be represented by clickable navigation tabs. In some embodiments, these functions include Connect, Analyze, Surveys, and Webcasts.

It is noted that, while the bankers' identities are maintained private, the vendors' identities are typically public. Thus, for example, at 1706, vendor user can connect with members on the banker platform by filling in identification ("Your Profile") information, including what products they make or sell, etc. Although in some embodiments, unsolicited contacts by vendors are not permitted, the members can request information of the vendors via the profiles.

An exemplary Profile page is shown in FIG. 18. The Profile page 1800 may include a company "biography," links provided by the vendor user 1804, contact information 1808, and Products and Reviews 1806 that name the company and the products the vendor user provides.

Returning to FIG. 17, as shown at 1704, a vendor can also analyze the information that is trading hands or being posted on the banker platform. For example, as discussed above, bankers can write product or vendor reviews. This data can be analyzed and displayed for each vendor, as shown at 1710. As will be described in greater detail below, in some embodiments, the review data may be broken down into numbers of reviews written about the registered vendor's products; total network reviews written over a predetermined period (e.g., 90 days); the total product reviews of the vendor; and the total product reviews over the entire system. In some embodiments, the vendor cannot see reviews of other companies.

In addition, in some embodiments, a vendor can search or view and respond to questions in the Questions/Answers workflow based on, for example, the Most Viewed Questions, as shown at 1712.

Vendor users may also be allowed to view and/or search specific topic by keyword 1714 and view most search terms 1716. Finally, vendor users may also view and/or browse the demographics of the members in the banker platform 1708.

In one embodiment, functions under the heading "Connect" allow vendor users to provide Answers, provide Content, view Exam Watch answers, be a Thought Leader, view Reviews, and view Profile. The Connect interface 1702 allows a vendor to interact with members by posting information, e.g., in the Answers workflow or uploading content to the Exchange.

As noted above, in some embodiments, a vendor user may view discussions about particular topics that have been posted into the Answers workflow, for example. In some embodiments, he may then post his own responses. In some embodiments, this sort of vendor user interaction may be dependent on the vendor user paying an additional fee.

An interface 1900 for viewing an exemplary topic from the Answers workflow is shown in FIG. 19*a*. In particular, a vendor user may view a question 1902 posted by a FI user, as well as one or more answers 1903*a*, 1903*b*. In addition, by clicking on an Answer Question link 1901, he can enter an answer to the question. Clicking a See More Details link 1907, the vendor user may view data about the types of FI users who are viewing and answering the question. Thus, for example, at 1904, this may include a breakdown by asset size or, as shown at 1906, a breakdown by job functions. In some embodiments, as will be discussed in greater detail below, answering questions or seeing more detail may require an upgraded level of membership.

In some embodiments, the vendor user can look at the views by asset size (1904) in either a weighted or unweighted fashion. That is, computation may be employed to weight answers provided by large banks differently than those of small banks.

Using the Provide Content function, vendor users can upload content for sale in the Exchange (FIG. 9D). As discussed above, FI users spend their collaboration points to buy content. In some embodiments, the service provider may review and approve or reject all content submitted by vendor users. In some embodiments, vendor users are allowed to see the data behind which FI user types bought or viewed their content, and can generate a private message based on that data, as will be explained in greater detail below.

Using the Exam Watch function, vendor users can view or read Exam Watch content posted by FI users (FIG. 7A and FIG. 7B).

Using the Be a Thought Leader function, vendor users can contribute to one of many service provider-defined topics. That is, in some embodiments, the service provider posts content on topics of interest to the FI users. The vendor users can use the Be a Thought Leader function to submit an analysis of the topic or read analyses of the topic by other vendor users.

With the Reviews function, vendors can view reviews of their products or services by the FI users (FIG. 9B, 9C). In some embodiments, the reviews may be grouped by product or by date.

In addition, as will be explained in greater detail below, some embodiments may allow a vendor user to pay or bid to provide a link to a related product (1910). These may be to the vendor user's system profile and product page, or to an external link. Such links may be provided on any content page provided by the banker collaboration platform (e.g., Exchange item, Answer, Exam Watch Vendor Review page, etc.).

Shown in FIG. 20 is an exemplary product review 2000 of a product called "cbanc exchange" 2202. The review 2000 may indicate the date the product was reviewed as well as an overall star review. In some embodiments, FI users' reviews of vendor products may be guided using answers to six criteria/questions. In some embodiments, these include Installation 2006, Training 2008, Customer Support 2010, Full-Featured 2012, Feature Requests 2014, and Buy Again? 2016. Each of the six factors my independently receive a star rating.

In addition, in some embodiments, the vendor user may provide a response 2018. In the example illustrated, this would be a public response, although in other embodiments, the response may be private or viewable only by the FI user who left the review. It is noted that in some embodiments, the vendor user cannot see the identity of the FI user who reviewed the product, but can see the star ratings and, in some embodiments, the comments as well. In some instances, the FI users may hide the comments.

Figure 21:
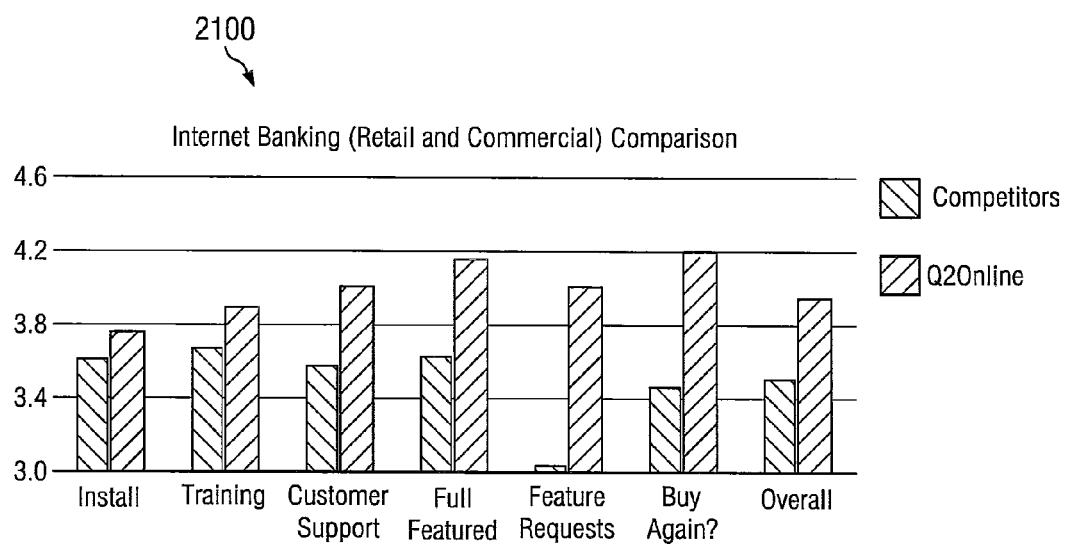
FIG. 21 depicts exemplary comparative data for vendor reviews.

In some embodiments, the review data may be aggregated by the Vendor Review Metrics service 1108, and vendors can see how their product in a given category or products compares to other products across each of the six questions. For example, shown in FIG. 21 is an exemplary graph 2100 showing comparative metrics for Internet Banking products for Q2Online vs. All Competitors. In particular, the graph shows the average scores of All Competitors based on 146 reviews in Internet Banking versus the average scores based on 51 reviews of Q2Online.

In some embodiments, the Access Rules Service 1104 functions to provide differing levels of access to the vendor collaboration system, depending on whether the vendor platform visitor has registered or registered and been vetted. A vendor platform visitor can become an unvetted vendor by registering with a public website maintained by the vendor collaboration platform. In some embodiments, the registration asks for the VP visitor name, company name, and email address. When the VP visitor submits this registration, they will immediately be sent an email with login credentials. In some embodiments, this is a free, unverified registration.

In some embodiments, the unvetted vendor can perform Restricted Searches, set up a Basic Profile, partially view Answers, set up Alerts, receive a Weekly Digest, View Topics, and View Exchange.

In some embodiments, the Restricted Search allows an unvetted vendor to search for key words and the search result will return the full list of results, but not all of the content is viewable without upgrading. In some embodiments, for example, the unvetted vendor can view partial answers, but not Exam Watch content.

In some embodiments, the Basic Profile includes vendor identification data, etc., but if additional elements are desired to be added, an upgrade is required. Such elements may include the ability to add external links and the ability to have FI users follow the vendor. Thus, for example with reference to FIG. 18, the Helpful Links 1804 would require an upgrade and/or additional fee.

The View Answers feature allow the unvetted vendors to see partial data on questions, answers, and the raw data of which FI users are involved with the question. Acting on that list (sending a Private Message), however, or adding a Product Link to that question would require upgrading.

In some embodiments, unvetted vendors may be allowed to set up unlimited alerts. These send an email to the unvetted vendor informing him that their desired keywords have been typed or discussed by FI users.

In some embodiments, unvetted vendors can receive a weekly digest summarizing key content and any content/activities associated with their own profile, messages, product links, etc.

In some embodiments, unvetted vendors can view topic analyses written by vendor users vendors, but would need to upgrade to add their own.

Finally, in some embodiments, unvetted vendors can see which content in the Exchange FI users are viewing and buying, the raw data of which FI users are involved with that content. Acting on that list (sending a Private Message) or adding a Product Link to that content would require upgrading.

In some embodiments, the free unvetted vendor can upgrade to any of four levels of membership. In some embodiments, these are termed Marketing, Research, Pro, or Enterprise.

In some embodiments, the Marketing level of membership allows the vendor user to update the basic profile to a dynamic profile (allowing FI users to follow the vendor user and link in to social media feeds); see full data on, and respond to, Questions/Answers; see and respond to Vendor Reviews about their own products; see comparative graph of competitor performance on reviews; Product Link to any activity-based FI user grouping; post content; and post topic commentary.

The Research level of membership, according to some embodiments, allows the vendor user to view Exam Watch content and use the Analyze tool set to get data trends and graphs around which types of FI users are focused on which kinds of content/issues. According to some embodiments, the Pro level includes all the features of Marketing and Research, with the addition of a predetermined number of Private Messages. Finally, the Enterprise level allows for unlimited access to all the vendor platform features for an unlimited number of users.

Analysis features available to vendor users, depending on their membership level, are shown with reference to FIG. 22A-22C. In particular, FIG. 22A shows an analysis dashboard 2200 that may be accessed by clicking the corresponding Analyze tab of the dashboard of FIG. 17.

In the embodiment illustrated, the user may navigate to Segmented Behavior and Member Demographics functions. The dashboard also allows vendor users to view "what is on the minds of FI users" 2204. More particularly, this allows vendor users to sort by job functions, types of institutions, asset size, and regions. In addition, the vendor user can enter keywords to search around a specific topic 2206 and view the most searched terms 2208.

In some embodiments, the vendor user may also see who is looking at his reviews 2210 and browse comments from the Exam Watch exams 2212.

The Segmented Behavior function allows vendor users to see what content the FI users care about, in the Exchange, Questions, Product Reviews, and Search Terms. An exemplary analysis 2232 of Exchange content is shown with reference to FIG. 22B. In the example illustrated, this can allow a vendor user to search materials being offered and purchased 2234; purchases by asset size 2236; identification of purchased content 2238; and content views 2240. The results are clickable and allow vendor users to see data in greater detail. For example, shown in FIG. 22C is the Exchange listing for FFIEF Authentication Risk Assessment/Training Packets/Project Plan. As shown, the vendor user can filter search results 2250 and view by predetermined breakdowns 2252. The results are displayed 2254 by the breakdown by job function 2254 and member demographic 2256. In addition, the member demographic for each Answer Provided, Purchase, etc., can be used by vendor users to sort parties to receive a private message, for example, using the Private Message button 2258.

The Member Demographic function allows users to view FI user member demographics, by Asset Size, Regions, Job Functions, and Financial Institution type.

As noted above, in some embodiments, a Private Messaging service 1112 (FIG. 11) may allow vendor users to send a private message to one or more FI users via the banker platform. Such messages can appear in the FI users' platform mailboxes (not shown) and/or as external emails. Such messages may include full return identification information, but the recipient is identified only by the asset size, region, etc., information. The message recipient may then be provided with an option to respond anonymously or with full contact information. The FI user receives a points incentive to view the message. The vendor user may pay more and add more points to the base incentive.

Figure 23:
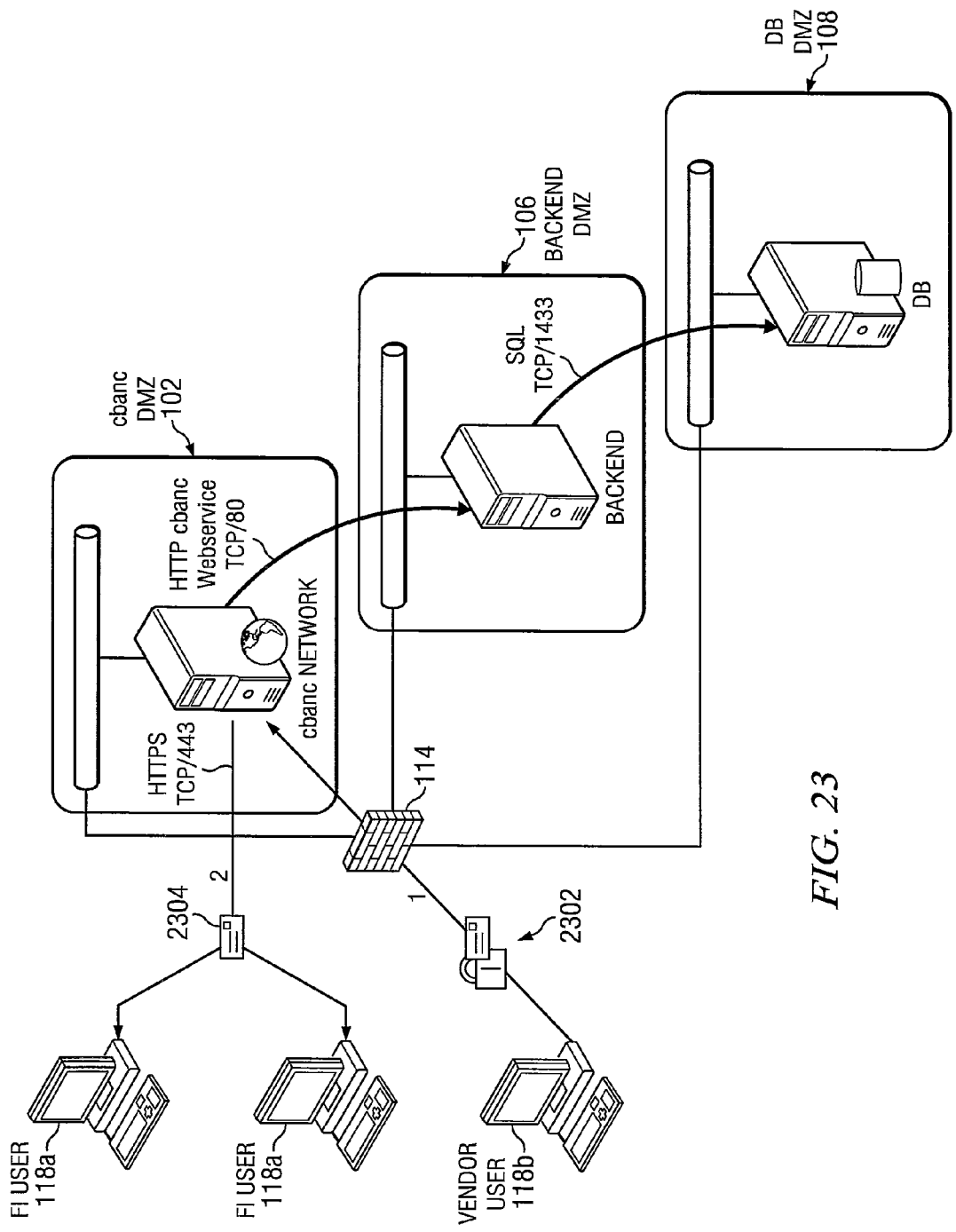
FIG. 23 illustrates exemplary vendor private messaging.

For example, shown in FIG. 23 is an example of private messaging. Similar to FIG. 1, an exemplary system may include the cbanc DMZ 102, backend DMZ 106, and DB DMZ 108. One or more FI users 118a and vendor users 118b may be in communication with the network 102 via one or more firewalls 114.

In operation, a vendor user 118b may compose a secure message 2302 and upload it to the cbanc network 102 via the firewall. The message may then be routed via the backend 106 to the database 108.

Figure 24:
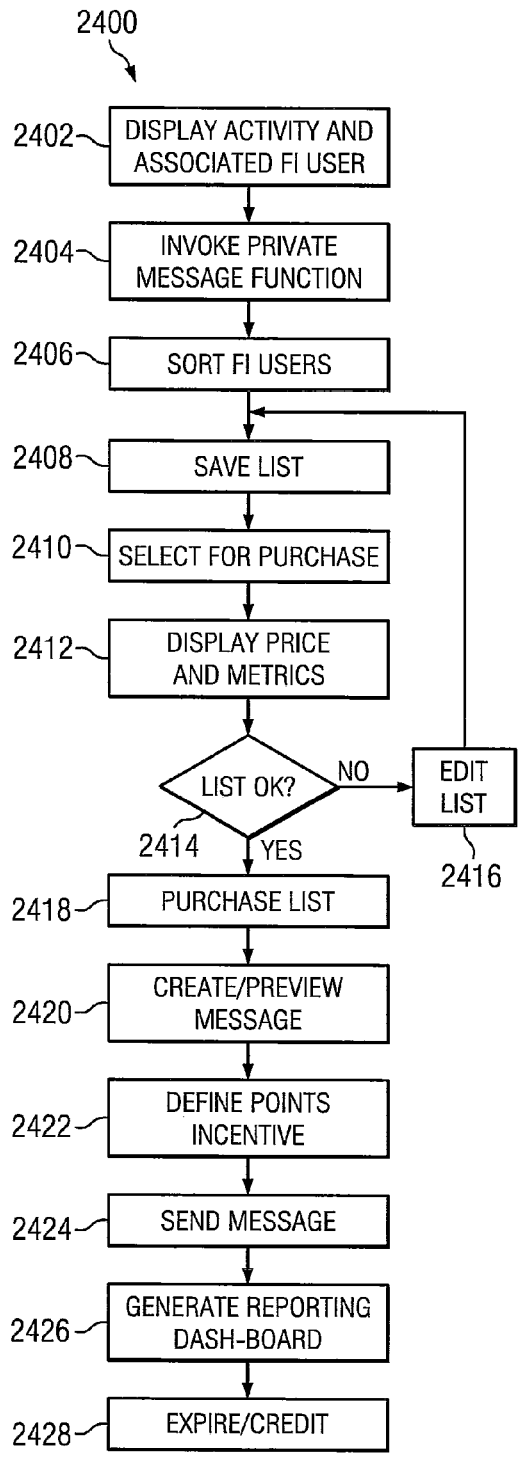
FIG. 24 depicts a flowchart illustrating operation of exemplary embodiments.

A flowchart 2400 illustrating exemplary operation of private messaging is shown in FIG. 24. Initially, the vendor collaboration platform will display activity and associated FI user information to the vendor user (step 2402). This may include, for example, answers and views of a question, or views and purchases of a piece of Exchange Content, etc. The vendor user may invoke a private message function to send a message to some or all the FI users associated with the activity (step 2404).

In response, the Private Messaging service will allow the vendor user to sort or filter the number of FI users associated with the activity who could receive the message (step 2406). In some embodiments, the names and institutions of the prospective recipient FI users are kept hidden, and the sorting can be by asset size, job title, region, and FI type (e.g., bank or credit union).

The vendor collaboration platform can then save the list (step 2408) for future editing by the vendor user. In addition, the list can be selected by the vendor user for purchase (step 2410). In some embodiments, different FI users may have different prices based on predetermined variables, such as Job Title or how in demand the particular FI user is during a given time period.

In particular, in some embodiments, a basic price predetermined by role, financial institution size, etc., may be defined. In some embodiments, the vendor user may set a maximum number of messages to be sent over a particular time (e.g., one week).

In addition, in some embodiments, the price for particular FI user types may be variable depending on how many messages the FI user has received over a particular time. If the number of messages the FI user has opened or received is greater than a user-defined or service provider-defined number, then the price could be adjusted upwards.

The Private Messaging service may then display to the vendor user the price for each selected FI user (step 2412). In some embodiments, the vendor user may be allowed to remove groupings of FI users (e.g., all CEOs) or individuals to reduce the price. In addition, in some embodiments, the vendor user may be shown other metrics associated with the selected FI users, such as how many messages they have received, how many they have opened, etc.

If the list okay (step 2414), the vendor user can purchase the list (step 2418), for example, by paying with a credit card. Otherwise, the list may be edited further (step 2416).

Once, however, the list has been purchased, the message can be created (step 2420). In some embodiments, the banker collaboration platform may provide a full HTML or other message editor. In other embodiments, limited message generation is provided, which may include only a (i) subject line; (ii) call to action; and (iii) attachment provision that allows the user to attach documents made offline (e.g., in PDF or Microsoft WORD format). Some embodiments may allow the vendor user to preview the message before it is sent.

The Private Message service may define one or more incentives of predetermined numbers of collaboration points in association with the message (step 2422). For example, in some embodiments, a basic number of points for opening and/or responding to the message may be provided. In other embodiments, the vendor user may be allowed to increase the number of points to increase the incentive for the FI user to respond. That is, the vendor user may buy more points or may use points from his already-established account.

The Private Messaging service may then send the message, in a manner similar to that discussed above with reference to FIG. 23 (step 2424), and generate one or more reporting dashboards (not shown)(step 2426) associated with the message. In some embodiments, this may include showing the open rate (e.g., as a number or a percentage), and a response rate, defined in terms of criteria such as Not Interested; Interested, but six months from now; Anonymous Reply; and Full Identity Reply.

Finally, in some embodiments, the messages expire in a predetermined period (step 2428), such as 90 days, so vendor users must send the ones they have purchased within that period. In some embodiments, messages that are sent but not opened within a (typically shorter) variable period, may be re-credited to the vendor user for re-use.

As noted above, some embodiments allow vendor users to use a Product Linking service 1114 to add links to their products to content pages seen by the FI users. For example, such links may be provided on pages such as Exchange item pages, Answer pages, Exam Watch pages, Vendor Review pages, etc. In some embodiments, the links are in a special box identified as "Related Products" and are provided on the content pages, such as those shown in FIGS. 9A-9E.

In some embodiments, each page has only a limited number (e.g., two or three) links. Vendor users may bid on a linking period, such as one month, to occupy a spot. In some embodiments, bidding closes a given number of days before the start of the linking period and the top two or three bidders will be able to display their links over that period. Immediately as that period draws to a close, new bidding for the next period opens. If the vendor user wants to retain the spot, he must compete to win with the best bid.

In some embodiments, at the close of the bidding period, a vendor user may have the option to buy out all available spaces. That is, in some embodiments, at the end of the period, if a vendor user bids more than the sum of the best bids for all available spaces, he may take all the spots. In some embodiments, pricing may depend on whether the link is internal to the vendor collaboration platform or to an external link, i.e., the vendor user's corporate web page.

Figure 25:
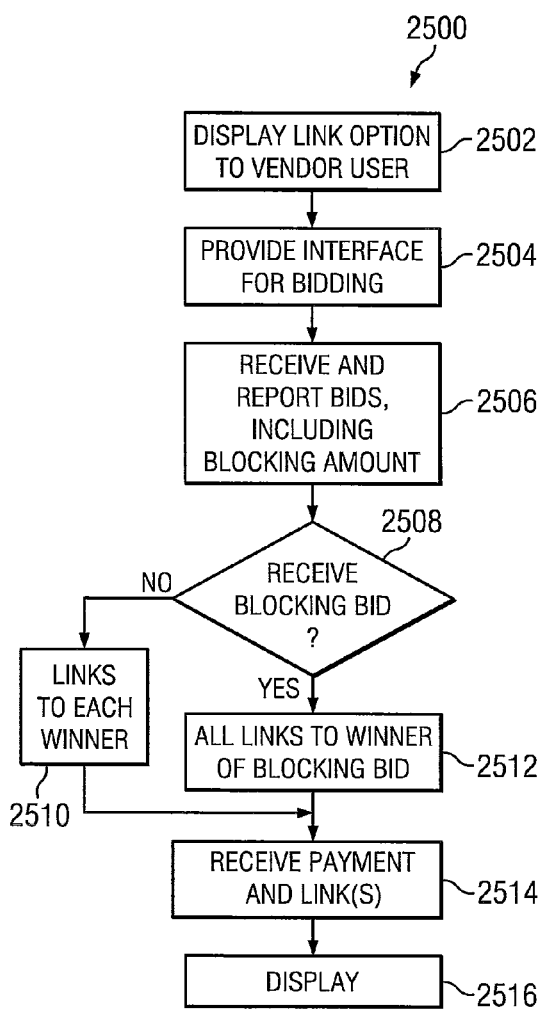
FIG. 25 depicts a flowchart illustrating operation of exemplary embodiments.

A flowchart 2500 illustrating operation of exemplary product linking is shown in FIG. 25. Initially, a link list option may be displayed to a vendor user on any content page, as discussed above (step 2502). The vendor collaboration system may then display an interface or dashboard to allow a vendor user to bid on that (or other) page's link(s) (step 2504).

At the end of the bidding period, the dashboard may display current bids sorted in decreasing order and may also include the blocking amount (i.e., the sum of the highest bids for all the available links) (step 2506). In some embodiments, the vendor user may receive an email or other message indicating the status of any bids he has made. If a blocking bid is received (step 2508), then all links in the particular auction may be reserved for the winner of the blocking bid (step 2512). Otherwise, they will be assigned to the highest individual bidders (step 2510).

The vendor collaboration platform may then receive the bid payment(s) and the bid links (step 2514). Finally, the link(s) may be displayed (step 2516).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A system for online information exchange between users, comprising:
    a first party platform on a network and collaboration site, the network and collaboration site being hosted on one or more server machines, the first party platform maintaining one or more private workflows, the one or more private workflows being accessible by registered first party users of the network and collaboration site and defining predetermined workflows through which the registered first party users of the network and collaboration site can collaborate, wherein information associated with identification of the registered first party users available to others of the registered first party users in at least some of the one or more private workflows is restricted according to first predetermined criteria;
    a second party platform on the network and collaboration site, the second party platform regulating access by registered second party users to the registered first party users of the first party platform and to posts in predetermined ones of the one or more private workflows of the first party platform; and
    a control logic embodied on the one or more server machines and communicatively coupled to the first party platform and the second party platform for registering the first and second party users and for controlling access to the network and collaboration site.

2. The system according to claim 1, wherein regulating access to the posts in the predetermined ones of the one or more private workflows of the first party platform comprises prohibiting all access by the second party users to one or more of the predetermined workflows for the registered first party users.

3. The system according to claim 2, wherein the one or more of the predetermined workflows for the registered first party users comprise assessments by the registered first party users of products or services associated with the registered second party users.

4. The system according to claim 1, wherein the second party platform further regulates access by the registered second party users to reports generated from data associated with one or more of the predetermined workflows.

5. The system according to claim 1, wherein the registered first party users represent registered and vetted financial institution users.

6. The system according to claim 1, wherein the registered second party users represent registered vendors.

7. The system according to claim 1, wherein the control logic further comprises a private messaging function through which a registered second party user is able to send one or more private messages to a predetermined number of the registered first party users and wherein one or more incentives are awarded the registered first party responsive to opening the one or more private messages.

8. The system according to claim 1, wherein the control logic further comprises a linking function through which a registered second party user is able to place one or more links in one or more private workflows for the registered first party users.

9. A method for online information exchange between users, comprising:
    forming one or more private workflows on a network and collaboration site, the one or more private workflows being accessible by registered first party users of the network and collaboration site and defining predetermined workflows through which the registered first party users of the network and collaboration site can collaborate, the network and collaboration site being hosted on one or more server machines, the forming performed by a control logic embodied on the one or more server machines wherein information associated with identification of the registered first party users available to others of the registered first party users in at least some of the one or more private workflows is restricted according to first predetermined criteria; and
    the control logic regulating access by registered second party users to the information associated with the identification of the registered first party users and to posts in predetermined ones of the one or more private workflows, wherein the regulating access is according to at least second predetermined criteria and wherein the regulating access comprises allowing and disallowing access to at least portions of the information or posts.

10. The method according to claim 9, further comprising prohibiting the registered second party users from accessing one or more of the predetermined workflows for the registered first party users.

11. The method according to claim 10, wherein the one or more of the predetermined workflows comprise assessments by the registered first party users of products or services associated with the registered second party users.

12. The method according to claim 10, further comprising allowing the registered second party users to access one or more reports generated from data associated with the one or more of the predetermined workflows for the registered first party users.

13. The method according to claim 9, wherein the registered first party users represent registered and vetted financial institution users.

14. The method according to claim 9, wherein the registered second party users represent registered vendors.

15. A computer program product comprising at least one non-transitory computer-readable medium storing instructions translatable by one or more computers to perform:
　　forming one or more private workflows on a network and collaboration site, the network and collaboration site being hosted on the one or more computers, the one or more private workflows being accessible by registered first party users of the network and collaboration site and defining predetermined workflows through which the registered first party users of the network and collaboration site can collaborate, wherein information associated with identification of the registered first party users available to others of the registered first party users in at least some of the one or more private workflows is restricted according to first predetermined criteria; and
　　regulating access by registered second party users to the information associated with the identification of the registered first party users and to posts in predetermined ones of the one or more private workflows, wherein the regulating access is according to at least second predetermined criteria and wherein the regulating access comprises allowing and disallowing access to at least portions of the information or posts.

16. The computer program product of claim 15, wherein the instructions are further translatable by the one or more computers to perform:
　　prohibiting the registered second party users from accessing one or more of the predetermined workflows for the registered first party users.

17. The computer program product of claim 15, wherein the one or more of the predetermined workflows comprise assessments by the registered first party users of products or services associated with the registered second party users.

18. The computer program product of claim 15, wherein the instructions are further translatable by the one or more computers to perform:
　　allowing the registered second party users to access one or more reports generated from data associated with the one or more of the predetermined workflows for the registered first party users.

19. The computer program product of claim 15, wherein the registered first party users represent registered and vetted financial institution users.

20. The computer program product of claim 15, wherein the registered second party users represent registered vendors.

* * * * *